US012797822B2

(12) United States Patent
Hoshino et al.

(10) Patent No.: US 12,797,822 B2
(45) Date of Patent: Nov. 17, 2026

(54) GAS ABSORBENT MATERIAL, GAS ABSORBENT BODY, GAS SEPARATION MATERIAL, FILTER, AND GAS SEPARATION DEVICE

(71) Applicant: JCCL, INC., Fukuoka (JP)

(72) Inventors: Yu Hoshino, Fukuoka (JP); Yuki Terayama, Fukuoka (JP); Kota Katafuchi, Fukuoka (JP); Chie Yamashita, Fukuoka (JP); Tomomi Fujiwara, Fukuoka (JP)

(73) Assignee: JCCL, INC., Fukuoka (JP)

( * ) Notice: Subject to any disclaimer, the term of this patent is extended or adjusted under 35 U.S.C. 154(b) by 1285 days.

(21) Appl. No.: 17/612,335

(22) PCT Filed: May 21, 2020

(86) PCT No.: PCT/JP2020/020080

§ 371 (c)(1),
(2) Date: Aug. 26, 2022

(87) PCT Pub. No.: WO2020/235623

PCT Pub. Date: Nov. 26, 2020

(65) Prior Publication Data

US 2023/0001382 A1 Jan. 5, 2023

(30) Foreign Application Priority Data

May 21, 2019 (JP) ................................ 2019-095511

(51) Int. Cl.

*B01J 20/26* (2006.01)
*B01D 53/62* (2006.01)

(Continued)

(52) U.S. Cl.

CPC ............ *B01J 20/261* (2013.01); *B01D 53/62* (2013.01); *B01D 53/81* (2013.01); *B01J 20/103* (2013.01);

(Continued)

(58) Field of Classification Search

CPC ........................................................ B01J 20/20

See application file for complete search history.

(56) References Cited

U.S. PATENT DOCUMENTS 5,102,673 A * 4/1992 Sugihara ................ B01J 20/041 206/205
10,974,482 B2 4/2021 Suzuki et al.

(Continued)

FOREIGN PATENT DOCUMENTS

CN 1845948 A 10/2006
CN 101868292 A 10/2010

(Continued)

OTHER PUBLICATIONS

Office Action dated Jan. 12, 2024 issued in the corresponding Chinese patent application No. 202080036733.4 with its English Machine Translation.

(Continued)

*Primary Examiner* — Peter F Godenschwager

(74) *Attorney, Agent, or Firm* — Troutman Pepper Locke LLP

(57) ABSTRACT

A gas-absorbing material that contains amino group-having polymer compound particles and fine particles having a primary particle diameter of 1000 nm or less is a gas-absorbing material having a markedly higher gas absorption/desorption speed. Here, as the polymer compound of the amino group-having polymer compound particles, for example, a (meth)acrylamide polymer can be used, and as (Continued)

the fine particles, for example, water-repellent inorganic particles or fluororesin particles can be used.

20 Claims, 9 Drawing Sheets

(51) Int. Cl.

| | |
|---|---|
| ***B01D 53/81*** | (2006.01) |
| ***B01J 20/10*** | (2006.01) |
| ***B01J 20/20*** | (2006.01) |
| ***B01J 20/28*** | (2006.01) |
| ***B01J 20/30*** | (2006.01) |

(52) U.S. Cl.

CPC ............ *B01J 20/20* (2013.01); *B01J 20/262* (2013.01); *B01J 20/28007* (2013.01); *B01J 20/28016* (2013.01); *B01J 20/3007* (2013.01); *B01D 2253/202* (2013.01); *B01D 2253/25* (2013.01); *B01D 2257/504* (2013.01)

(56) References Cited

U.S. PATENT DOCUMENTS

| | | | |
|---|---|---|---|
| 10,981,122 | B2 | 4/2021 | Hoshino et al. |
| 10,987,652 | B2 | 4/2021 | Hoshino et al. |
| 2010/0255310 | A1 | 10/2010 | Chen et al. |
| 2016/0367948 | A1 | 12/2016 | Song et al. |
| 2017/0259245 | A1 | 9/2017 | Hoshino et al. |

FOREIGN PATENT DOCUMENTS

| | | | |
|---|---|---|---|
| CN | 103418356 | A | 12/2013 |
| CN | 106660010 | A | 5/2017 |
| JP | H11-276857 | A | 10/1999 |
| JP | 2013-133399 | A | 7/2013 |
| JP | 2014-533195 | A | 12/2014 |
| JP | 2017-507011 | A | 3/2017 |
| JP | 2017-509744 | A | 4/2017 |
| JP | 2019-027718 | A | 2/2019 |
| WO | 2009/067625 | A1 | 5/2009 |
| WO | 2013/052637 | A2 | 4/2013 |
| WO | 2015/084521 | A1 | 6/2015 |
| WO | 2015/129925 | A1 | 9/2015 |
| WO | 2016/024633 | A1 | 2/2016 |
| WO | 2017/146231 | A1 | 8/2017 |
| WO | 2017/160646 | A2 | 9/2017 |
| WO | 2017/183447 | A1 | 10/2017 |
| WO | 2018/079656 | A1 | 5/2018 |

OTHER PUBLICATIONS

Office Action dated Jan. 16, 2024 issued in the corresponding Japanese patent application No. 2021-520838 with its English Machine Translation.

Chinese Office Action dated Jul. 4, 2023, from corresponding Chinese patent application No. 202080036733.4.

Office Action dated Apr. 26, 2024 issued in the corresponding Chinese patent application No. 202080036733.4 with its English Machine Translation.

International Preliminary Report on Patentability dated Nov. 16, 2021 in corresponding International Application No. PCT/JP2020/020080.

International Search Report dated Aug. 11, 2020, in corresponding International Application No. PCT/JP2020/020080.

Extended European Search Report dated Jun. 9, 2023 issued in the corresponding European patent application No. 20808766.8.

Office Action dated Dec. 23, 2025, issued in the corresponding Japanese patent application No. 2024-089388 with its English Machine Translation.

* cited by examiner

[FIG. 1]
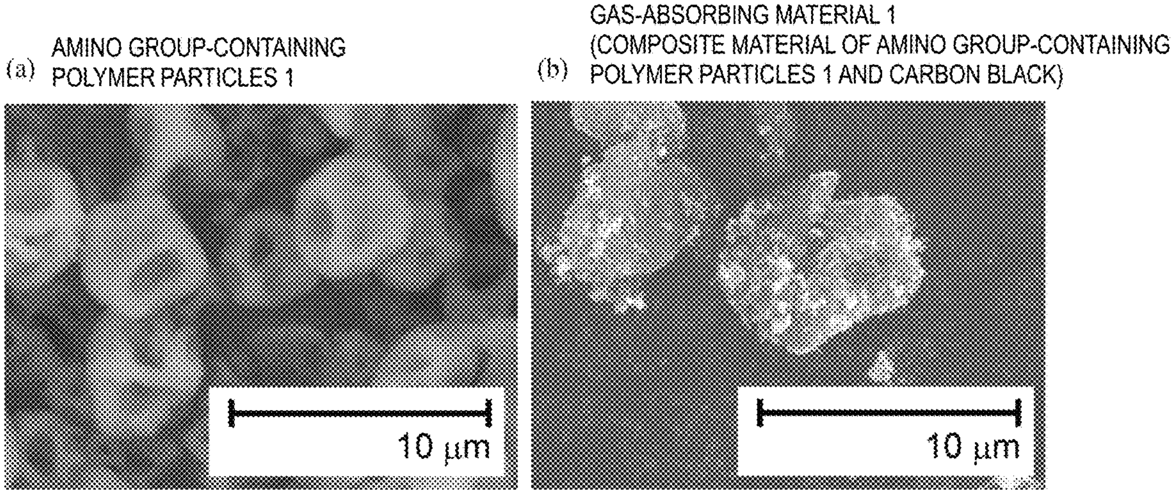
[FIG. 2]
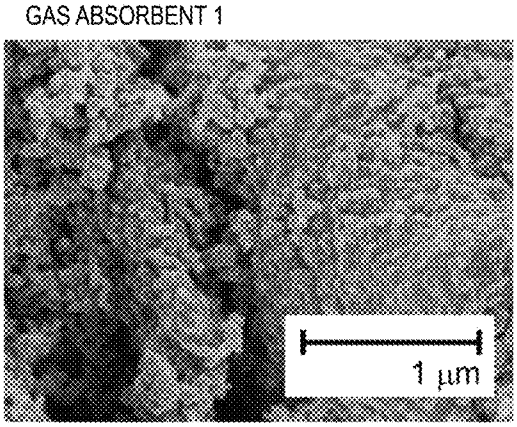
[FIG. 3]
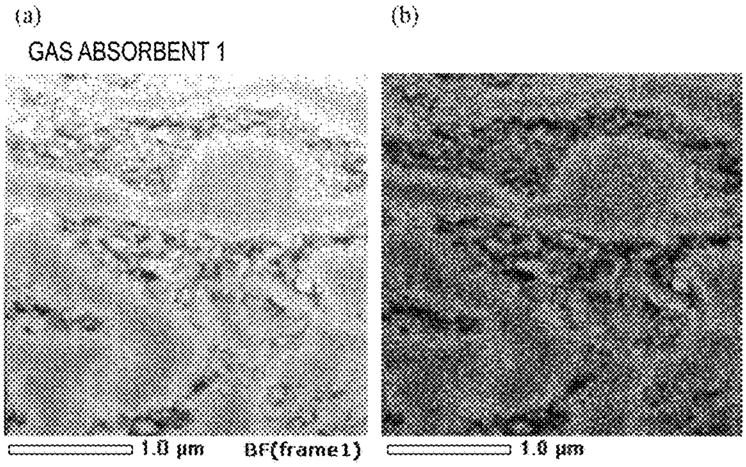

[FIG. 4]
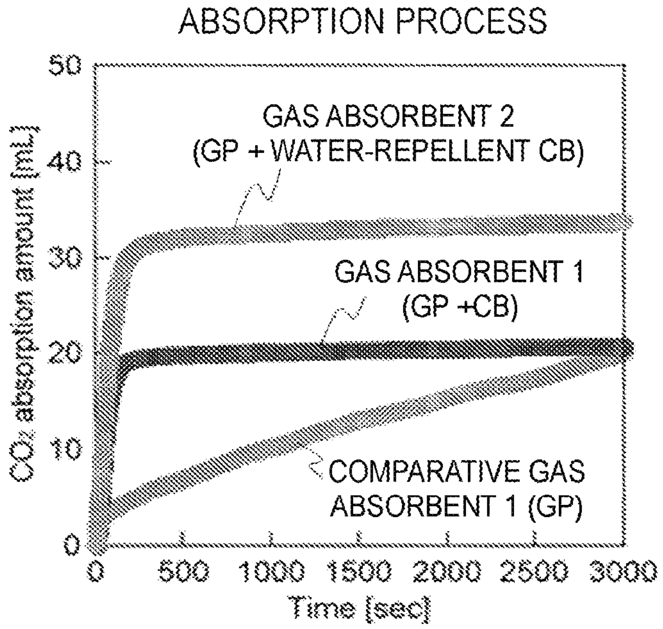
[FIG. 5]
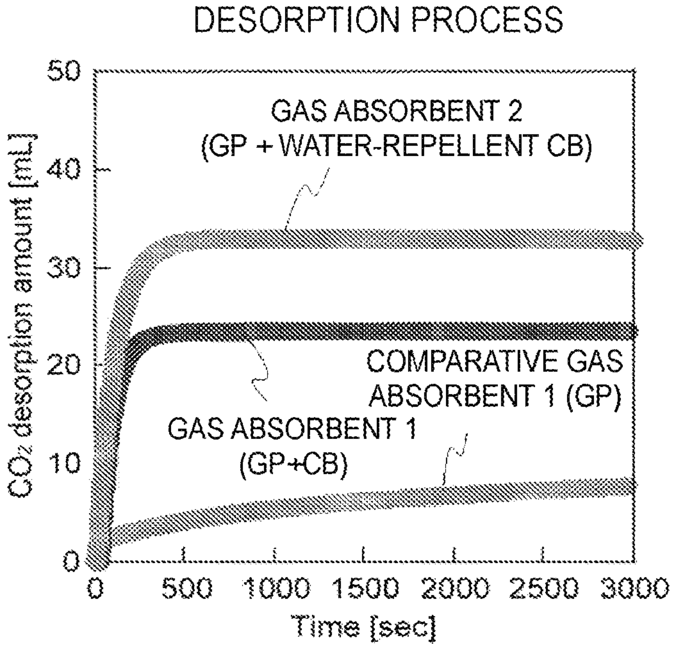

[FIG. 6]
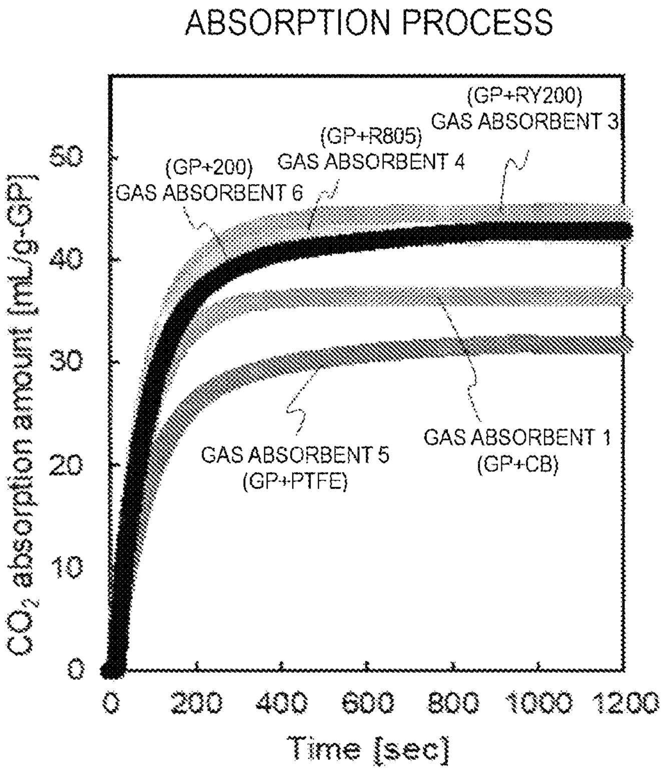
[FIG. 7]
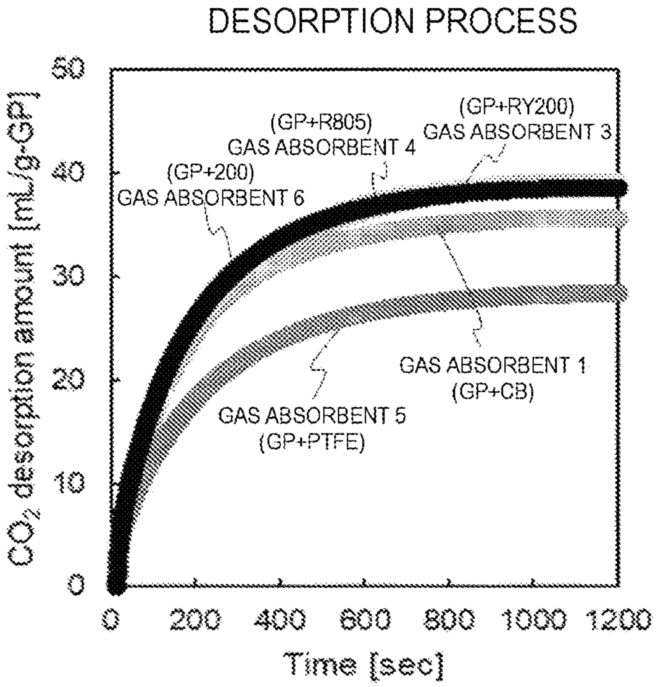

[FIG. 8]
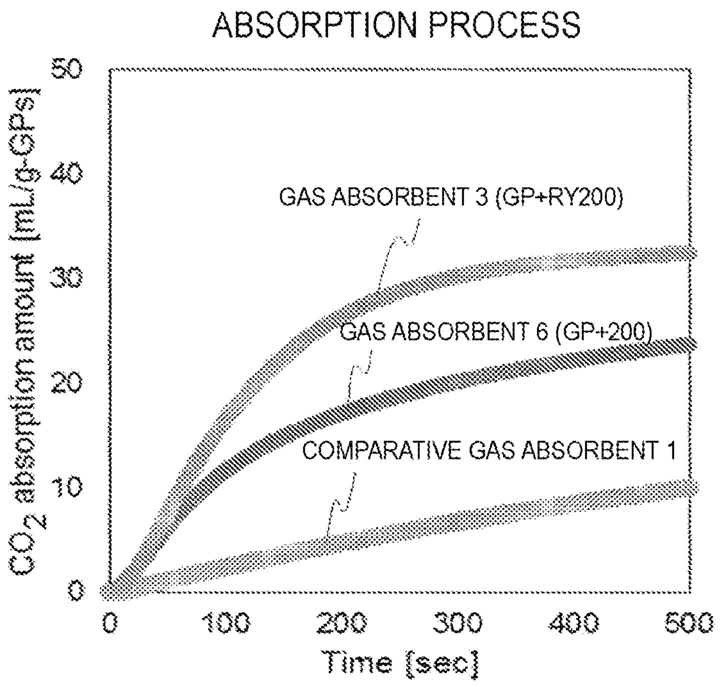
[FIG. 9]
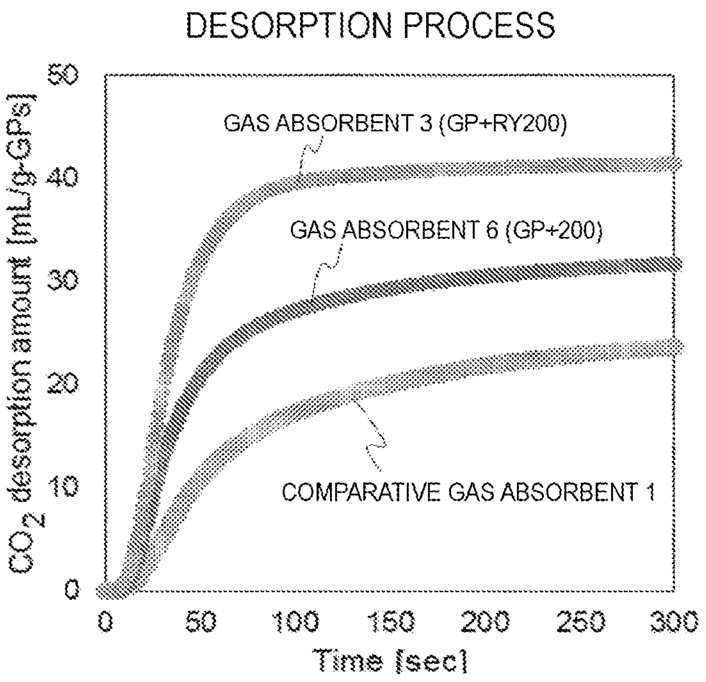

[FIG. 10]
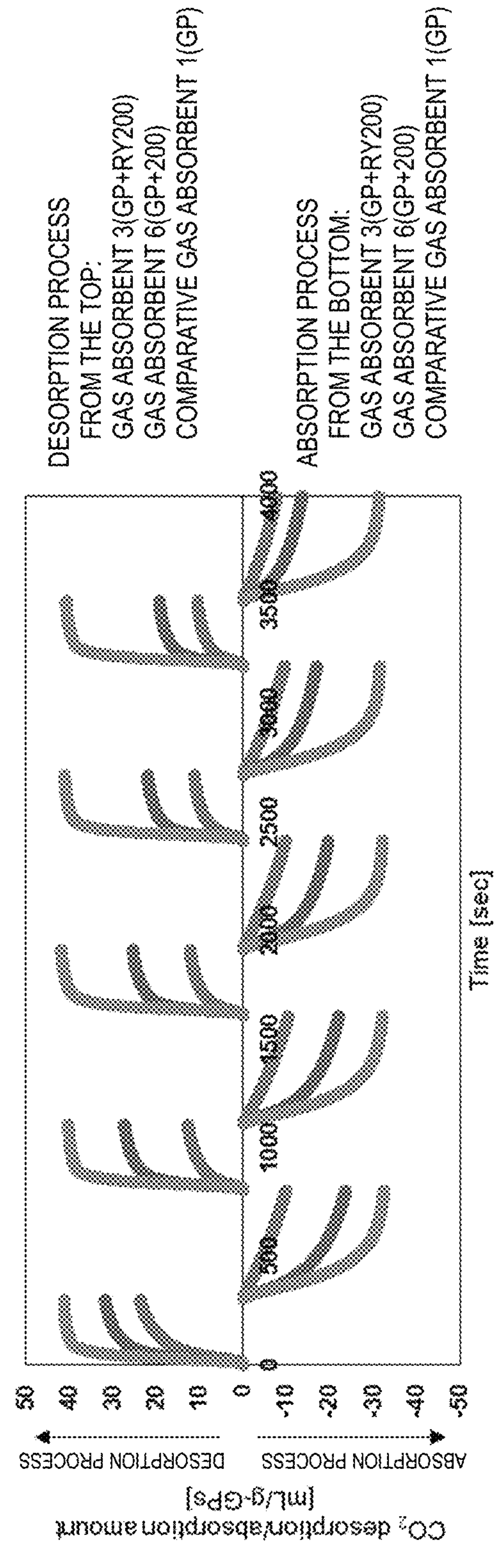

[FIG. 11]
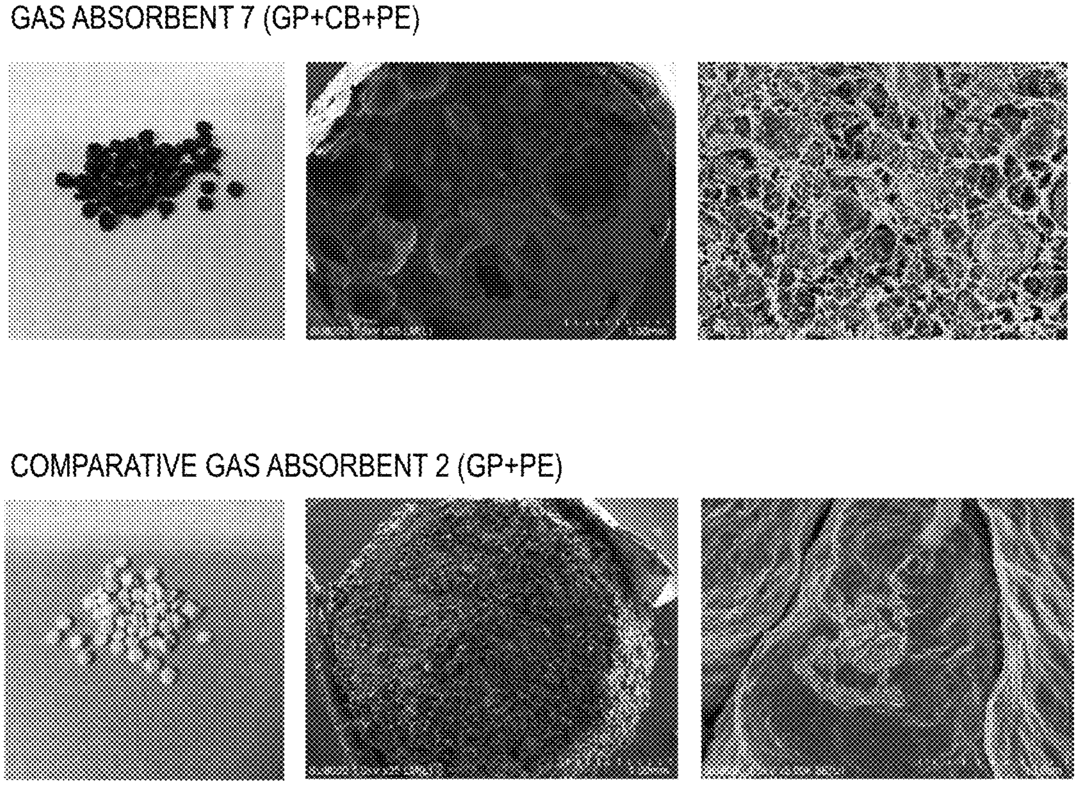
[FIG. 12]
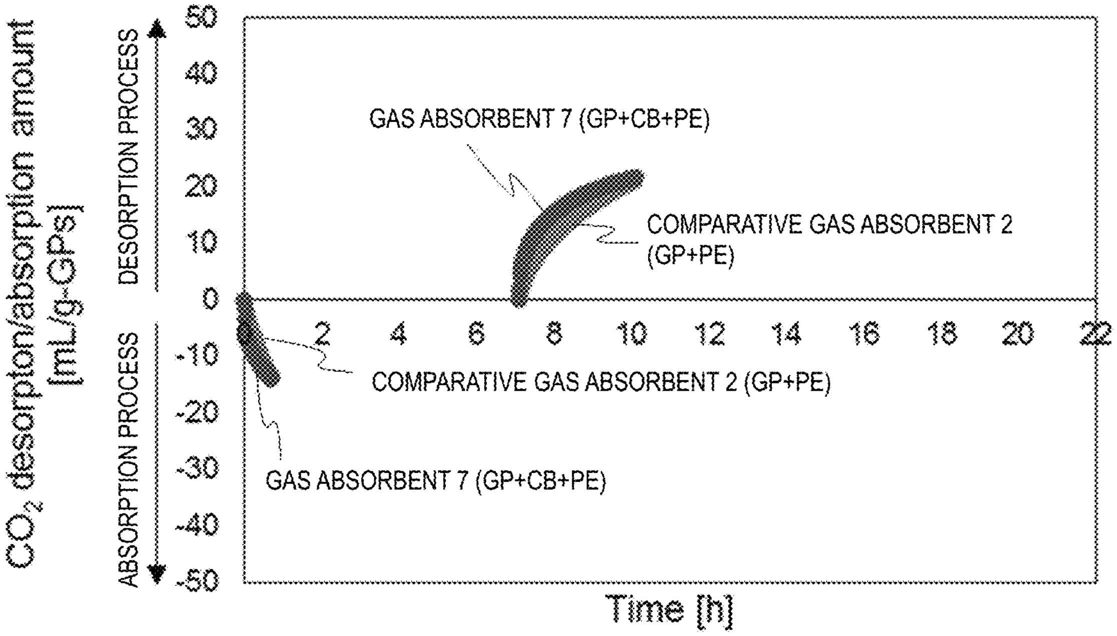

[FIG. 13]
PARTICLE SIZE DISTRIBUTION OF MIXTURE OF DIFFERENT TYPE OF AMINO GROUP-CONTAINING POLYMER GROUND PRODUCT AND RY300
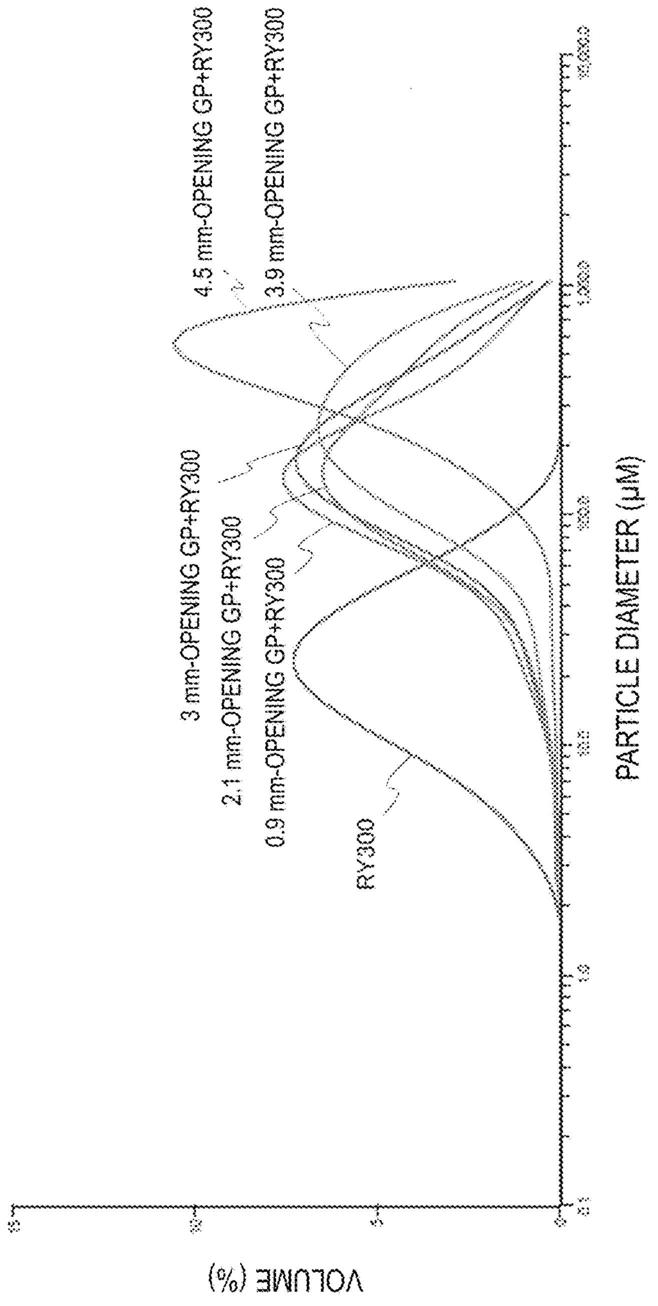

[FIG. 14]
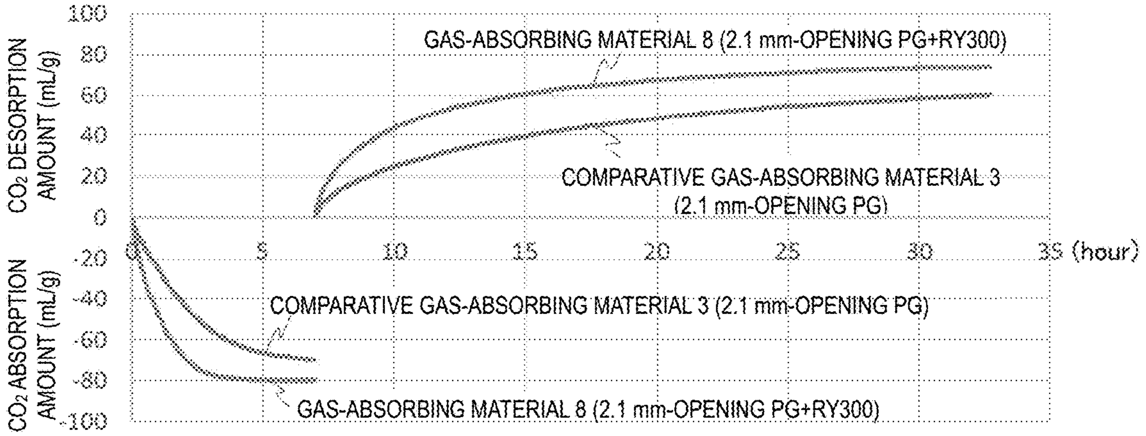
[FIG. 15]
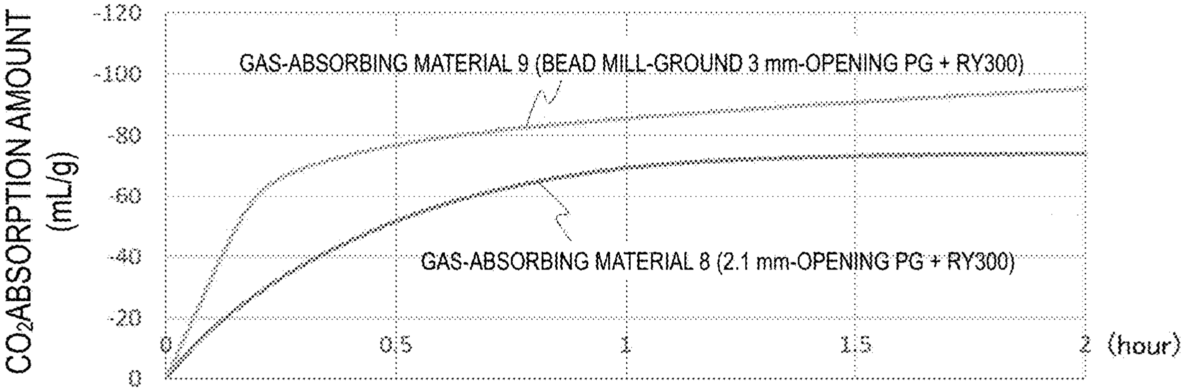

[FIG. 16]
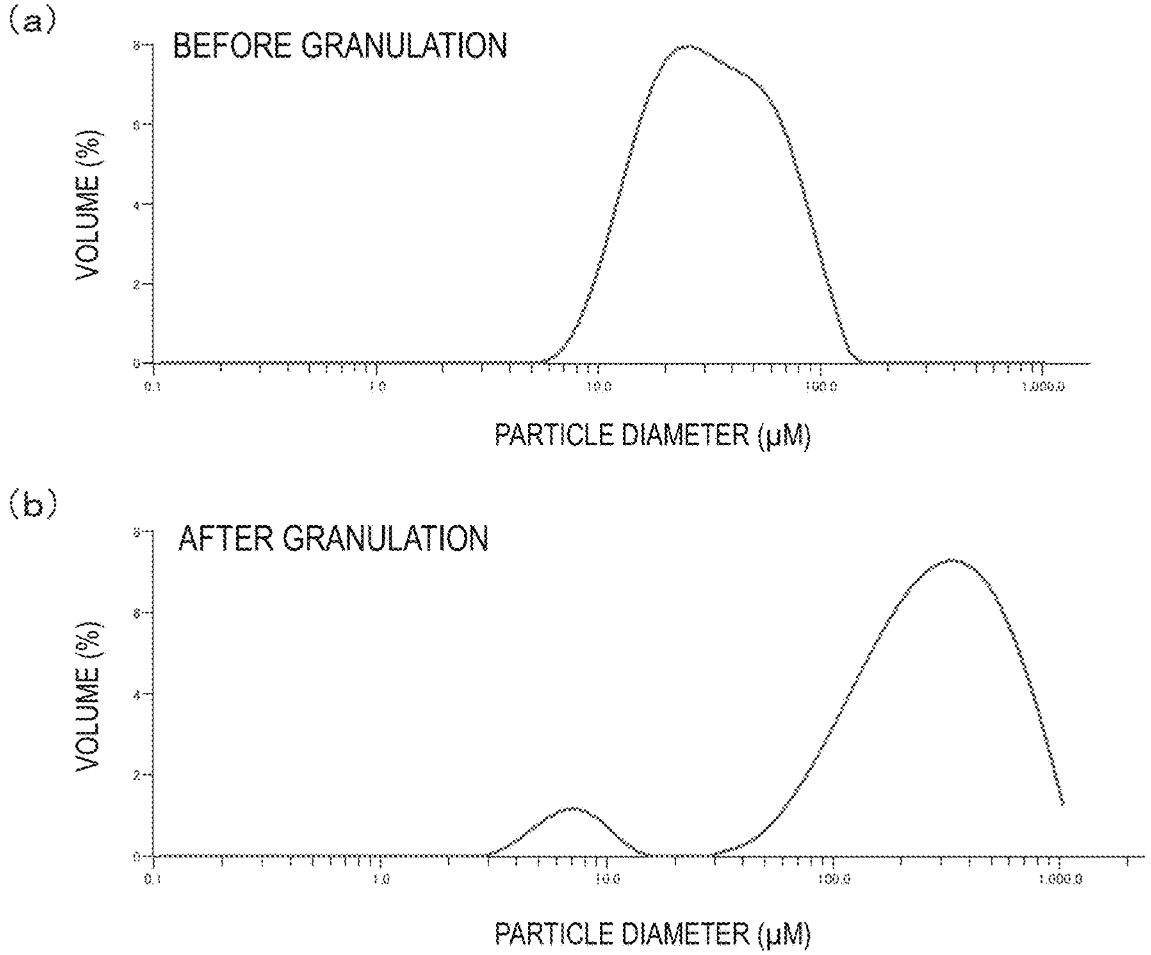

GAS ABSORBENT MATERIAL, GAS ABSORBENT BODY, GAS SEPARATION MATERIAL, FILTER, AND GAS SEPARATION DEVICE

TECHNICAL FIELD

The present invention relates to a gas-absorbing material excellent in reversible absorption performance for gases such as carbon dioxide, and to a gas absorbent, a gas separator, a filter and a gas separation unit using the gas-absorbing material.

BACKGROUND ART

In recent years, global warming due to carbon dioxide discharged from large-scale facilities such as thermal power plants, iron plants and cement plants, and environmental pollution due to hydrogen sulfide have become problematic. In order to suppress such climate fluctuations and environmental pollution and realize a low-carbon society, studies have been made on a method for carbon dioxide capture and storage (CCS) of separating and collecting an acidic gas such as carbon dioxide or hydrogen sulfide from an exhaust gas containing a large amount of water vapor discharged from these large-scale facilities and capturing and storing it in the ground or under the seabed. However, in the current technology, the energy cost required for CCS is very high, and a significant reduction in the energy cost is required. In particular, the process of separating and recovering carbon dioxide occupies about 60% of the energy cost in CCS, and therefore in order to reduce the energy cost in CCS, it is essential to increase the efficiency of the process of separating and recovering carbon dioxide and to save energy considerably. Also in the field of energy supply, processes for separating and recovering acidic gases such as carbon dioxide and hydrogen sulfide and water vapor from natural gas having a high carbon dioxide concentration, coal gas generated by an integrated gasification combined cycle (IGCC), and fuel gas such as hydrogen used in a fuel cell have been carried out, and high-efficiency and energy-saving separation and recovering processes for carbon dioxide are also important in reducing energy costs in such fields.

Here, for gas separation and recovery, specifically, employed is a process of once absorbing the gas targeted for separation and recovery and then desorbing it. Consequently, for reducing the energy cost, development of gas-absorbing materials that can efficiently absorb and desorb acidic gases such as carbon dioxide at low cost has been actively progressing.

For example, PTLs 1 and 2 propose use of gel particles of a polymer compound having an amino group as a gas-absorbing material. The gel particles exhibit gas absorption/desorption performance such that they have a high basicity at a temperature of about 30° C. and absorb carbon dioxide, but when heated up to about 75° C., the basicity thereof lowers and they desorb carbon dioxide. By utilizing such performance, it is said that a gas absorbing material inexpensive and excellent in reversible gas absorption performance can be provided.

CITATION LIST

Patent Literature

PTL 1: WO2016/024633
PTL 2: WO2017/146231

SUMMARY OF INVENTION

Technical Problem

As described above, it has been known that gel particles of a polymer compound having an amino group have excellent gas absorption/desorption performance. The present inventors evaluated the practicability of the gel particles and have confirmed that, by actually forming the gel particles into films or filling them in a column, excellent gas absorption/desorption performance is attained. On the other hand, for further increasing the gas absorption/desorption performance, it has been found that merely forming into films or filling in a column is limited and it is necessary to devise from a new viewpoint.

Therefore, in order to solve such a problem of the conventional art, the present inventors have made further studies for the purpose of providing a gas-absorbing material having a much higher gas absorption/desorption speed by using amino group-having polymer compound particles.

Solution to Problem

As a result of assiduous studies made for the purpose of solving the above-mentioned problems, the present inventors have reached a finding that, when fine particles having a primary particle diameter of 1000 nm or less are added to a gas-absorbing material that uses amino group-having polymer compound particles, then the gas absorbing speed and desorbing speed of the gas-absorbing material can be extremely improved. The present invention has been proposed based on the finding, and specifically has the following constitution.

[1] A gas-absorbing material that contains amino group-having polymer compound particles and fine particles having a primary particle diameter of 1000 nm or less (excepting the amino group-having polymer compound particles).

[2] The gas-absorbing material according to [1], wherein the fine particles are particles containing silica or carbon.

[3] The gas-absorbing material according to [1] or [2], wherein the water contact angle of the fine particles is 70° or more.

[4] The gas-absorbing material according to any one of [1] to [3], wherein the fine particles are particles containing a carbon black or a fluororesin.

[5] The gas-absorbing material according to any one of [1] to [4], wherein the fine particle has a substrate particle and a water-repellent coating film formed on the surface of the substrate particle.

[6] The gas-absorbing material according to [5], wherein the water-repellent coating film contains a dialkylpolysiloxane.

[7] The gas-absorbing material according to any one of [1] to [4], wherein the fine particles are ones prepared by subjecting the substrate particles to water repellency-imparting surface treatment.

[8] The gas-absorbing material according to [7], wherein the surface modification is one for introducing an alkyl group into the substrate particles.

[9] The gas-absorbing material according to any one of [5] to [8], wherein the substrate particles are inorganic fine particles.

[10] The gas-absorbing material according to any one of [5] to [9], wherein the water contact angle of the substrate particles is 70° or more.

[11] The gas-absorbing material according to any one of [1] to [10], wherein the average primary particle diameter of the fine particles is 5 to 200 nm.

[12] The gas-absorbing material according to any one of [1] to [11], wherein the amino group-having polymer compound particles contain a polymer of a monomer component containing an amino group-having substituted (meth)acrylamide monomer.

[13] The gas-absorbing material according to [12], wherein the amino group-having substituted (meth)acrylamide monomer is an N-(aminoalkyl)(meth)acrylamide.

[14] The gas-absorbing material according to any one of [1] to [13], wherein the median diameter of the amino group-having polymer compound particles in a dry state is 1 to 50 μm.

[15] The gas-absorbing material according to any one of [1] to [14], wherein the average primary particle diameter of the fine particles is smaller than the median diameter of the amino group-having polymer compound particles in a dry state.

[16] The gas-absorbing material according to any one of [1] to [15], wherein the content of the amino group-having polymer compound particles is, as a solid content, larger than the content of the fine particles.

[17] A gas absorbent containing granulated particles of a gas-absorbing material of any one of [1] to [16].

[18] A gas absorbent of a shaped article of a mixture that contains a gas-absorbing material of any one of [1] to [16] and a thermoplastic resin.

[19] The gas absorbent according to [18], wherein the mixture contains, as the gas-absorbing material, granulated particles of the gas-absorbing material.

[20] A gas absorbent containing a powder compaction-molded article of a gas-absorbing material of any one of [1] to [16].

[21] The gas absorbent according to any one of [17] to [20], further containing a filler.

[22] The gas absorbent according to [21], wherein the filler is active carbon or zeolite.

[23] A method for producing a gas absorbent, including a step of putting a composite material obtained by dry-mixing amino group-having polymer compound particles and fine particles having a primary particle diameter of 1000 nm or less, into a forming mold, and pressure-forming it therein.

[24] A gas separator containing a gas-absorbing material of any one of [1] to [16].

[25] The gas separator according to [24], which is for selectively separating an acidic gas from a mixed gas.

[26] The gas separator according to [25], wherein the acidic gas is carbon dioxide.

[27] A filter having a gas separator of any one of [24] to [26].

[28] A gas separation unit having a gas separator of any one of [24] to [26].

Advantageous Effects of Invention

The gas-absorbing material and the gas absorbent of the present invention have a high gas absorption/desorption speed, and show excellent reversible gas absorption performance. Accordingly, by using the gas-absorbing material or the gas absorbent of the present invention in a gas separator, the time efficiency of the gas separation and recovery process is improved, and the cost required for the process can be reduced.

BRIEF DESCRIPTION OF DRAWINGS

FIG. 1 This shows scanning electron micrographs (SEM photographs) of particles used in Examples, in which (a) is a SEM photograph of amino group-containing polymer particles 1, and (b) is a SEM photograph of a composite material of amino group-containing polymer particles 1 and carbon black.

FIG. 2 This is a SEM photograph showing an internal structure of a molded article (gas absorbent 1) formed by film-like pressure powder-molding of the composite material.

FIG. 3 This shows transmission electron micrographs (TEM photographs) of a gas absorbent 1, in which (a) is a TEM photograph of a slice cut out of the gas absorbent 1, and (b) is a TEM image of characteristic X rays of nitrogen and carbon emitted in energy dispersive X-ray spectrometry (EDX).

FIG. 4 This is a graph showing a $CO_2$ absorption amount in an absorption step of a gas absorbent 1 containing amino group-containing polymer particles 1 and carbon black, a gas absorbent 2 containing amino group-containing polymer particles 1 and water-repellent carbon black, and a comparative gas absorbent 1 containing amino group-containing polymer particles 1 alone.

FIG. 5 This is a graph showing a $CO_2$ desorption amount in a desorption step of a gas absorbent 1 containing amino group-containing polymer particles 1 and carbon black, a gas absorbent 2 containing amino group-containing polymer particles 1 and water-repellent carbon black, and a comparative gas absorbent 1 containing amino group-containing polymer particles 1 alone.

FIG. 6 This is a graph showing a $CO_2$ absorption amount in an absorption step of gas absorbents 1 and 3 to 6 containing amino group-containing polymer particles 1, and carbon black, RY200, R805, PTFE particles or hydrophilic silica 200, respectively.

FIG. 7 This is a graph showing a $CO_2$ desorption amount in a desorption step of gas absorbents 1 and 3 to 6 containing amino group-containing polymer particles 1, and carbon black, RY200, R805, PTFE particles or hydrophilic silica 200, respectively.

FIG. 8 This is a graph showing a $CO_2$ absorption amount in an absorption step of gas absorbents 3 and 6 containing amino group-containing polymer particles 1, and RY200 or 200, and a comparative gas absorbent 1 containing amino group-containing polymer particles 1 alone, measured in a temperature swing absorption method.

FIG. 9 This is a graph showing a $CO_2$ desorption amount in a desorption step of gas absorbents 3 and 6 containing amino group-containing polymer particles 1, and RY200 or 200, and a comparative gas absorbent 1 containing amino group-containing polymer particles 1 alone, measured in a temperature swing absorption method.

FIG. 10 This is a graph showing desorption-absorption cycle characteristics of gas absorbents 3 and 6 containing amino group-containing polymer particles 1, and RY200 or 200, and a comparative gas absorbent 1 containing amino group-containing polymer particles 1 alone, measured in a temperature swing absorption method.

FIG. 11 This shows SEM photographs of pellets (gas absorbent 7) of a mixture prepared by mixing amino group-containing polymer particles 1 and carbon black (gas-absorbing material) and polyethylene, and pellets (comparative gas absorbent 2) of a mixture prepared by mixing amino group-containing polymer particles 1 and polyethylene.

FIG. 12 This is a graph showing a $CO_2$ absorption amount in an absorption step and a $CO_2$ desorption amount in a desorption step of pellets (gas absorbent 7) of a mixture prepared by mixing amino group-containing polymer particles 1 and carbon black (gas-absorbing material) and polyethylene, and pellets (comparative gas absorbent 2) of a mixture prepared by mixing amino group-containing polymer particles 1 and polyethylene.

FIG. 13 This shows a particle size distribution of a mixture of a different type of an amino group-containing polymer ground product and RY300.

FIG. 14 This is a graph showing a $CO_2$ absorption amount in an absorption step and a $CO_2$ desorption amount in a desorption step of a gas-absorbing material 8 that contains a ground product of an amino group-containing polymer as ground at an opening degree of 2.1 mm and RY300, and a comparative gas-absorbing material 3 that contains only a ground product of an amino group-containing polymer as ground at an opening degree of 2.1 mm.

FIG. 15 This is a graph showing a $CO_2$ absorption amount in an absorption step of a gas-absorbing material 8 that contains a ground product of an amino group-containing polymer as ground at an opening degree of 2.1 mm and RY300, and a ground product (gas-absorbing material 9) prepared by grinding in a bead mill a mixture of a ground product of an amino group-containing polymer as ground at an opening degree of 4.5 mm, and RY300.

FIG. 16 This shows a particle size change in a process of granulation of a mixture of a ground product of an amino group-containing polymer as ground at an opening degree of 2.1 mm, and RY300 by binder spraying, in which (a) is a particle size distribution before granulation, and (b) is a particle size distribution after granulation.

DESCRIPTION OF EMBODIMENTS

Hereinunder the present invention is described in detail. The description of the constitutive elements given hereinunder is for some typical embodiments or examples, to which, however, the present invention should not be limited. In this description, the numerical range expressed by a wording "a number to another number" means a range that falls between the former number indicating the lower limit of the range and the latter number indicating the upper limit thereof. Also in this description, "(meth)acrylamide" means "acrylamide" and "methacrylamide". Room temperature means 20° C.

<Gas-Absorbing Material>

The gas-absorbing material of the present invention contains amino group-having polymer compound particles and fine particles having a primary particle diameter of 1000 nm or less (excepting the "amino group-having polymer compound particles").

In the present invention, "containing fine particles having a primary particle diameter of 1000 nm or less (excepting the "amino group-having polymer compound particles")" means that the material further contains fine particles having a primary particle diameter of 1000 nm or less in addition to the amino group-having polymer compound particles. In the following description, "fine particles having a primary particle diameter of 1000 nm or less (excepting the "amino group-having polymer compound particles")" may be simply referred to as "fine particles".

The gas-absorbing material has a high gas absorption/desorption speed and a large gas absorption/desorption amount and exhibits excellent reversible gas absorption performance. This is assumed to be due to the following mechanism.

Namely, as shown in Examples give hereinunder, when a gas-absorbing material containing an amino group-having polymer compound particles and fine particles having a primary particle diameter of 1000 nm or less is molded, open pores not seen in a gas-absorbing material not containing fine particles are formed inside it. The open pores are considered to effectively function as a gas diffusion phase. Consequently, in the gas-absorbing material, the introduced gas can readily penetrate into the inside thereof and reacts with the amino group of the polymer compound particles therefore bringing about a state where the gas has been sufficiently absorbed within a short period of time. In addition, when the gas is desorbed from the polymer compound particles, depending on the condition changes such as temperature change and gas partial pressure change, the desorbed gas can readily diffuse outside through the gas diffusion phase. According to such a mechanism, it is presumed that the gas-absorbing material of the present invention can have a high gas absorption/desorption speed and can exhibit excellent reversible gas absorption performance.

In particular, in the case where the fine particles are water-repellent fine particles, the inside of the open pores can be repellent to water and therefore water can hardly exist inside the pores. As a result, the pores can more effectively function as a gas diffusion phase therefore exhibiting more excellent reversible gas absorption performance. Here, regarding the meaning of "water-repellent fine particles", reference may be made to the description in the section of "Fine Particles having primary particle diameter of 1000 nm or less" to be given hereinunder.

In the following, the amino group-having polymer compound particles, the fine particles having a primary particle diameter of 1000 nm or less and other optional components that the gas-absorbing material of the present invention contains are described.

[Amino Group-Having Polymer Compound Particles]

The "amino group-having polymer compound particles" for use in the present invention are particles of an amino group-having polymer compound, and are preferably composed of an amino group-having polymer compound alone, but may contain materials used in preparing the particles, for example, a component for controlling the particle diameter such as a surfactant, and a polymer of a (meth)acrylamide derivative, a crosslinking agent and an unreacted monomer.

(Amino Group-Having Polymer Compound)

The amino group of the amino group-having polymer compound may be any of a primary amino group, a secondary amino group or a tertiary amino group, and is preferably such that the acid dissociation constant of the conjugated acid is planned. In particular, for dissolving carbon dioxide, it is preferable that the acid dissociation constant of the amino group is equivalent to or larger than the acid dissociation constant of carbonic acid. Above all, a secondary or tertiary amino group is preferred, and a tertiary amino group is more preferred. Even more preferred is a dialkylamino group such as a dimethylamino group. Also the amino group of the polymer compound may bond to the main chain or may bond to the side chain, but preferably bonds to the side chain.

Also preferably, the amino group-having polymer compound has a hydrophobic group. The hydrophobic group to be introduced into the polymer compound includes a hydrocarbon group represented by $C_XH_{2X}$ or $C_XH_{2X+1}$, preferably a methyl group, an ethyl group, a propyl group, an isopropyl group, a butyl group, an isobutyl group, a tert-butyl group, a pentyl group, a cyclopentyl group, an isopentyl group, a hexyl group, and a cyclohexyl group. Above all, preferred are an isobutyl group and a tert-butyl group. A hydroxy group may bond to the hydrophobic group to be a hydroxyethyl group, a hydroxypropyl group or a hydroxybutyl group.

Not specifically limited, the amino group-having polymer compound for use for the particles includes a (meth)acrylamide polymer and a derivative thereof, a polyethyleneimine and a derivative thereof, a polyvinylamine and a derivative thereof, a polyvinyl alcohol and a derivative thereof, and a polyallylamine and a derivative thereof. Preferred is a (meth)acrylamide polymer, and more preferred is an acrylamide polymer. Specific examples of the constituent monomer to introduce an amino group include N,N-dimethylaminopropylmethacrylamide, N,N-diethylaminopropylmethacrylamide, N,N-dimethylaminoethylmethacrylamide, N,N-diethylaminoethylmethacrylamide, N,N-dimethylaminopropyl methacrylate, N,-diethylaminopropyl methacrylate, N,N-dimethylaminoethyl methacrylate, N,N-diethylaminoethyl methacrylate, N,N-dimethylaminopropylacrylamide, N,N-diethylaminopropylacrylamide, N,N-dimethylaminoethylacrylamide, N,N-diethylaminoethylacrylamide, 3-aminopropylmethacrylamide hydrochloride, 3-aminopropylacrylamide hydrochloride, N,N-dimethylaminopropyl acrylate, N,N-diethylaminopropyl acrylate, N,N-dimethylaminoethyl acrylate, N,N-di ethylaminoethyl acrylate, 3-aminopropyl methacrylate hydrochloride, and 3-aminopropyl acrylate hydrochloride.

The amino group-having polymer compound is preferably such that the polymer density inside the particles thereof is 0.3 to 90%, more preferably 1 to 80%, in a dispersion state after the polymer compound particles are swollen in water.

(Gelling Performance of Amino Group-Having Polymer Compound Particles)

The amino group-having polymer compound particles for use in the present invention are preferably amino group-having gellable polymer particles. Here, the "gellable polymer particles" mean polymer particles having a property of swelling in water or in a polar solvent to form gel-like fine particles. Preferred gellable polymer particles are particles that are to have, after dispersed and fully swollen in water at 30° C., a water content inside the particles of 20 to 99.7%. Other preferred gellable polymer particles are particles that are to have, after dispersed and fully swollen in water at 30° C., a hydrodynamic diameter of 20 nm to 1000 μm (for example, 20 to 2000 nm). Preferably, the gellable polymer particles are reversible ones such that after they are swollen and gelled in water or in a polar solvent and then water or the polar solvent is removed to dry the particles and further thereafter water or a polar solvent is added, the particles can be restored to the original gel state.

(Particle Diameter of Amino Group-Having Polymer Compound Particles)

The amino group-having polymer compound particles for use in the present invention preferably have, in a dry state, a median diameter of 5 nm to 500 μm (for example, 5 nm to 50 μm), more preferably 1 to 200 μm (for example, 1 to 20 μm). The median diameter of the amino group-having polymer compound particles in a dry state can be measured with a dry laser diffraction particle diameter distribution measuring device. The parameter is preferably 20 or more, more preferably 50 or more.

The hydrodynamic particle size of the amino group-having polymer compound particles after swollen in water is, as a hydrodynamic diameter in water measured according to a dynamic light scattering method, preferably 10 nm to 1000 μm (for example, 10 nm to 100 μm), more preferably 50 nm to 500 μm (for example, 50 nm to 50 μm), even more preferably 100 nm to 200 μm (for example, 100 nm to 20 μm), further more preferably 200 nm to 100 μm (for example, 200 nm to 10 μm). The "particle size after swollen in water" of the polymer compound particles means a particle size of the dried polymer compound particles measured after immersed in water at 30° C. for 24 hours, and is an average particle diameter measured according to a dynamic light scattering method.

It is considered that, when the particle size of the amino group-having polymer compound particles falls within the above range, the diffusion length of the molecule (gas molecule or gas molecule-derived ion) in the gel particles can fall within an appropriate range and therefore the gas absorption/desorption speed tends to improve more.

(Preparation of Amino Group-Having Polymer Compound Particles)

The amino group-having polymer compound particles can be prepared using solutions that contain monomer components (hereinafter these may be referred to as "particles preparing liquids"). In this description, "monomer components" mean all monomers to be used in synthesis of the polymer of the amino group-having polymer compound particles. The method for producing the polymer compound particles is not specifically limited, for which employable are conventionally-known methods such as a precipitation polymerization method, a pseudo-precipitation polymerization method, an emulsion polymerization method, a dispersion polymerization method, a suspension polymerization method, a seed polymerization method, a bulk polymerization method, and a mass polymerization method.

The monomer component to be used in preparing the particles contains at least an amino group-having monomer and preferably contains an amino group-having monomer and a monomer not having an amino group. Namely, the amino group-having polymer compound may be a homopolymer or a copolymer of an amino group-having monomer, or may also be a copolymer of an amino group-having monomer and a monomer not having an amino group. Accordingly, by controlling the proportion of these monomers, the density of the amino group in the polymer compound particles can be controlled to fall within an appropriate range. The amino group-having monomer and the optional monomer not having an amino group that is used as needed each are preferably a substituted (meth)acrylamide monomer, more preferably a substituted methacrylamide monomer.

For the description and the preferred range of the amino group-having monomer, reference may be made to the description in the section of (Amino Group-Having Polymer Compound). The number of the amino groups that the monomer has is not specifically limited, and may be 1, or may also be 2 or more. In the case where the monomer has 2 or more amino groups, the amino groups may be the same or different.

Not specifically limited, the amino group-having monomer includes an N-(aminoalkyl)acrylamide and an N-(aminoalkyl)methacrylamide, and preferred is an N-(aminoalkyl) methacrylamide. For the specific examples of the amino group-having monomer, reference may be made to the description of "Specific Constituent Monomers" in the section of (Amino Group-Having Polymer Compound).

Preferably, the monomer component contains a monomer having a hydrophobic group along with the amino group-having monomer. Regarding the description and the preferred range of the hydrophobic group of the hydrophobic group-having monomer, reference may be made to the description in the section of (Amino Group-Having Polymer Compound). Preferably, the hydrophobic group exists in the side chain. The hydrophobic group-having monomer may further have or may not have an amino group. By introducing the hydrophobic group-having monomer into the polymer, the ambient environment of the amino group therein can be made to be hydrophobic to suitably control the acidity of the conjugated acid of the amino group.

Not specifically limited, the hydrophobic group-having monomer includes an N-alkylacrylamide, an N-alkylmethacrylamide, an N-alkyl acrylate, an N-alkyl methacrylate, an N,N-dialkylacrylamide, an N-(hydroxyakyl)methacrylamide, an N,N-dialkyl acrylate, an N-(hydroxyalkyl) methacrylate, an N,N-dialkylmethacrylamide, an N-(hydroxyalkyl) acrylamide, an N,N-dialkyl methacrylate, and an N-(hydroxyalkyl) acrylate, and is preferably an N-alkylacrylamide.

A preferred combination of the amino group-having monomer and the hydrophobic group-having monomer is a combination of an N-(aminoalkyl)(meth)acrylamide and an N-alkyl(meth)acrylamide, and a combination of an N-(aminoalkyl)methacrylamide and an N-alkylacrylamide is preferred. In the particles of a copolymer of an N-(aminoalkyl)(meth)acrylamide and an N-alkyl(meth)acrylamide, a hydrophobic alkyl group and a hydrogen-bonding amide are uniformly distributed in the molecule in a well-balanced manner.

The proportion of the amino group-having monomer in the monomer component is preferably 1 to 95 mol % based on the total number of moles of the monomer component, more preferably 30 to 85 mol %, and can be, for example, 30 to 60 mol %. In the case where the monomer component contains a hydrophobic group-having monomer, the molar ratio of the amino group-having monomer to the hydrophobic group-having monomer is preferably 95/5 to 5/95, more preferably 2/1 to 1/2. A monomer having both an amino group and a hydrophobic group is grouped into the amino group-having monomer.

The monomer component may have a composition not containing a monomer that does not have an amino group (a composition of 100 mol % amino group-having monomer), or the blending amount of the monomer not having an amino group may be a small amount (for example, less than 5 mol %). In such cases, by increasing the crosslinking density or by increasing the monomer concentration during polymerization, the acid dissociation constant of the conjugated acid of the amino group can be appropriately controlled.

The particles preparing liquid can contain the monomer component alone, or can contain any other component. The other component includes a crosslinking agent, a polymerization initiator, and a pKa regulator. By controlling the kind and the concentration of the surfactant to be added to the particles preparing liquid, the particle size of the polymer compound particles to be produced can be controlled. By using a crosslinking agent, a crosslinking structure can be formed in the polymer compound inside the particles to control the swellability of the particles so that the particles are not too much swollen. In the case where a relatively large amount of a crosslinking agent is used or in the case where the monomer concentration during polymerization is set relatively high, a crosslinking structure can also be formed between the particles. With that, a relatively large open pore structure can be formed between the composite particles linking via a crosslinking structure. A pKa regulator is for regulating the pKa of the polymer compound particles to be produced to a desired value, and with that, the absorption amount of an acidic gas in an intended partial pressure range can be greatly varied depending on the change in the temperature and the partial pressure.

As the surfactant, usable here is a cationic surfactant such as cetyltrimethylammonium bromide.

The crosslinking agent may be any one capable of forming a crosslinking structure between the monomers used, and is preferably an N,N'-alkylenebisacrylamide. The carbon number of the alkylene group of the N,N'-alkylenebisacrylamide is, though not specifically limited thereto, preferably 1 to 12, more preferably 1 to 4, even more preferably 1 to 2. Also usable is a crosslinking agent in which oligoethyleneimine or oligoethylene glycol functions as a crosslinking agent chain in place of the alkylene group.

The pKa regulator usable herein is one capable of protonating or deprotonating the amino group of monomers, and an acid such as hydrochloric acid or a base such as sodium chloride can be used by appropriately varying the concentration thereof in accordance with the desired pKa. By the crosslinking ratio of the crosslinking agent, the pKa of the polymer compound particles can also be controlled, and therefore the above-mentioned crosslinking agent can also be sued as a pKa regulator.

Not specifically limited, the solvent for the particles preparing liquid may be a polar solvent such as water, methanol, ethanol, isopropanol, acetonitrile, N,N-dimethylformamide or dimethyl sulfoxide. A mixed solvent of a combination of 2 or more kinds of these polar solvents is also usable. Above all, preferably used is water, or a mixed solvent of water and any other polar solvent.

The amino group-having polymer compound particles can be used in producing the gas-absorbing material as dry particles (solid particles), or can also be used in producing the gas-absorbing material as gel particles swollen in a liquid, but preferably the particles are used in producing the gas-absorbing material as dry particles. The dry particles can be prepared, for example, by drying a suspension containing the amino group-having polymer compound particles according to a spray-drying method. Also a ground product produced by grinding the gel as an aggregate of gel particles is preferably used. For grinding the gel, for example, a meat chopper can be used.

[Fine Particles Having Primary Particle Diameter of 1000 nm or Less]

In the present invention, fine particles having a primary particle diameter of 1000 nm or less (excepting the amino group-having polymer compound particles) are used as combined with the amino group-having polymer compound particles.

The "primary particle diameter" of the "fine particles having a primary particle diameter of 1000 nm or less" can be measured by transmission electron microscope observation. The "fine particles having a primary particle diameter of 1000 nm or less" used in the present invention preferably consist of only fine particles having a primary particle diameter of 1000 nm or less.

The particle diameter of the fine particles used in the present invention is preferably 0.1 nm to 1000 nm as an average primary particle diameter, more preferably 0.3 nm to 300 nm, even more preferably 1 nm to 200 nm, further more preferably 1.5 nm to 100 nm, further more preferably 2 nm to 50 nm, most preferably 2.5 nm to 25 nm. With that, a gas diffusion phase can be more surely formed in a molded article of the gas-absorbent material to more improve the gas absorption/desorption speed. The fine particles may be ones formed by aggregation of primary particles. The aggregate is preferably 100 nm to 200 μm, more preferably 500 nm to 100 μm, most preferably 2.5 μm to 50 μm.

The fine particles can be composed of an inorganic material or can be composed of an inorganic material or an organic material, or can also be composed of a combination of an organic material and an inorganic material. They can contain silica or carbon, and can be, for example, carbon black or fumed silica. Also, the fine particles can be water-repellent fine particles or hydrophilic fine particles. When used in an environment where water vapor may readily condense or dew, especially preferred are water-repellent fine particles. As described above, when water-repellent fine particles are used, fine pores formed by the fine particles can function more effectively as a gas diffusion phase.

Here, "water-repellent fine particles" means fine particles having a primary particle diameter of 1000 nm or less and having a water contact angle of 70° or more. "Water contact angle" of fine particles means a contact angle with water measured on the surface of the fine particle deposit film formed of the fine particles. The water contact angle on the surface of the fine particle deposit film can be measured by hydrostatic contact angle measurement with water.

The water contact angle of the water-repellent fine particles is preferably 80° or more, more preferably 100° or more, even more preferably 110° or more, further more preferably 120° or more, further more preferably 130° or more, and most preferably 140° or more.

In the following, constituent materials of water-repellent fine particles and other fine particles usable as the fine particles of the gas-absorbing material are described.

(Water-Repellent Fine Particles)

The water-repellent fine particles can be fine particles having water repellency by themselves, or may be those prepared by imparting water repellency to the surfaces of the particles to be a substrate (substrate particles). Fine particles prepared by imparting water repellency to the surfaces of substrate particles include coating film-having fine particles prepared by forming a water-repellent coating film on the surface of a substrate, and surface-modified fine particles prepared by surface modification of substrate particles for imparting water repellency thereto.

The fine particles having water repellency by themselves include carbon black. Examples of the carbon black include acetylene black, furnace black, channel black, thermal black, lamp black, and Ketjen black, and above all, acetylene black is preferred.

As other water-repellent fine particles, there are mentioned fine particles of CNovel (porous carbon, by Toyo Tanso Co., Ltd.), titanium oxide, and mesoporous silica.

Also as fine particles having water repellency by themselves, there are mentioned fine particles formed of a water-repellent organic material. The water-repellent organic material for use for forming particles includes a fluororesin containing a structural unit represented by —($CA^1A^2$-$CA^3A^4$)- (wherein $A^1$ to $A^4$ each represents a hydrogen atom, a fluorine atom, a chlorine atom or a perfluoroalkyl group, and at least one of $A^1$ to $A^4$ is a fluorine atom). Specific examples of the fluororesin include polytetrafluoroethylene (PTFE), a copolymer of tetrafluoroethylene and any other monomer, polychlorotrifluoroethylene (PCTFE), a copolymer of chlorotrifluoroethylene and any other monomer, polyvinylidene fluoride (PVDV), polyvinyl fluoride (PVF), and polytetrafluoropropylene (HEP). The copolymer of tetrafluoroethylene and any other monomer includes a perfluoroalkoxyalkane (PFA: tetrafluoroethylene and perfluoroalkyl vinyl ether copolymer), perfluoroethylene-propene copolymer (FEP: tetrafluoroethylene and hexafluoropropylene copolymer), an ethylene-tetrafluoroethylene copolymer (ETFE), and a tetrafluoroethylene-perfluorodioxol copolymer (TFE/PDD). The copolymer of chlorotrifluoroethylene and any other monomer includes an ethylene-chlorotrifluoroethylene copolymer (ECTFE).

One alone or two or more kinds of these water-repellent organic materials can be used either singly or as combined.

The substrate particles for the coating film-having fine particles and the surface-modified fine particles may be inorganic particles or organic particles, but are preferably inorganic particles. When fine particles having water repellency by themselves are used as the substrate particles and when the fine particles are processed to have a water-repellent coating film thereon, or are surface-modified for imparting water repellency thereto, the gas absorption and desorption amount thereof can be enhanced along with the gas absorption speed and desorption speed thereof.

As the inorganic particles, known ones can be used, including particles of an inorganic compound, such as carbon black, e.g., acetylene black, furnace black, channel black, thermal black, lamp black and Ketjen black, and an oxide, a hydroxide, a nitride, a halide, a carbonate, a sulfate, an acetate or a phosphate of a metal element or a semi-metal element, and natural mineral particles. The inorganic compound with a metal element or a semi-metal element includes lithium fluoride, calcium carbonate, calcium phosphate, calcium sulfate, calcium fluoride, barium sulfate, titanium dioxide (titania), zirconium dioxide (zirconia), aluminum oxide (alumina), alumina silicates (alumina silicate, kaolin, kaolinite), and silicon dioxide (silica, silica gel); and the natural mineral includes talc and clay. Among these, preferred are particles of carbon black or silicon oxide.

As the organic particles, known ones can be used, including particles of styrene-based, acrylic, melamine-based, benzoguanamine-based or silicone-based polymers. At that time, a filler can be used concurrently. For example, active carbon or zeolite is preferably used as a filler.

As the water-repellent coating film to coat the substrate particles, usable is a coating film of an organopolysiloxane or an organohydrogen polysiloxane, in addition to the water-repellent organic material exemplified hereinabove as the water-repellent material for use for forming fine particles. The organosiloxane includes a dialkylpolysiloxane, and an alkylphenylpolysiloxane, and the organohydrogen polysiloxane includes an alkylhydrogen polysiloxane. The alkyl group in the dialkylpolysiloxane, the alkylphenylpolysiloxane and the alkylhydrogen polysiloxane may be linear, branched or cyclic, but is preferably linear. The carbon number of the alkyl group is preferably 1 to 20, more preferably 1 to 10, even more preferably 1 to 6. Here, the two alkyl groups bonding to the silicon atom may be the same as or different from each other. Specific examples of the organopolysiloxane include dimethylpolysiloxane and methylphenylpolysiloxane; and specific examples of the organohydrogen polysiloxane include methylhydrogen polysiloxane.

The surface modification method to be applied to the substrate particles includes a method of introducing a water-repellent group such as an alkyl group or a fluoroalkyl group into the surfaces of the substrate particles. The alkyl group and the fluoroalkyl group to be introduced into the substrate may be linear, branched or cyclic, but are preferably linear. The carbon number of the alkyl group and the fluoroalkyl group is preferably 1 to 20, more preferably 1 to 15, even more preferably 1 to 10. The fluoroalkyl group may be a partial fluoroalkyl group where a part of the hydrogen atoms of the alkyl group are substituted with fluorine atoms, or may be a perfluoroalkyl group where all of the hydrogen atoms of the alkyl group are substituted with fluorine atoms.

Surface modification for introducing such a water-repellent group into the substrate particles can be attained by using a silane compound such as a silane coupling agent or a silazane. The silane coupling agent includes compounds represented by the following general formula (1).

$$R^1_nSiX_{(4-n)} \quad (1)$$

In the general formula (1), X represents a hydrolyzable group capable of forming a silanol group by hydrolysis, $R^1$ represents a group containing a water-repellent group, and n represents an integer of 1 to 3.

In the silane coupling agent represented by the general formula (1), the silanol group or the silyl group formed by hydrolysis of X reacts with the functional group on the surfaces of the substrate particles to introduce a water-repellent group into the substrate particles.

In the general formula (1), "hydrolyzable group capable of forming a silanol group" represented by X includes an alkoxy group such as a methoxy group and an ethoxy group, and a halogen group.

The water-repellent group in $R^1$ includes an alkyl group, a fluoroalkyl group, and a dimethylsiloxane. Regarding the description and the preferred range of the alkyl group and the fluoroalkyl group, reference may be made to the description and the preferred range of the water-repellent group that can be introduced into the surfaces of the substrate particles. The water-repellent group can directly bond to Si, or can bond thereto via a linking group.

n is an integer of 1 to 3, preferably 1 or 2. When n is 2 or more, plural $R^1$'s may be the same as or different from each other. When n is 2 or less, plural X's may be the same as or different from each other.

Examples of the silane coupling agent represented by the general formula (1) include triethoxyalkylsilane, diethoxydialkylsilane, ethoxytrialkylsilane, trimethoxyalkylsilane, dimethoxydialkylsilane, methoxytrialkylsilane, and trichloroalkylsilane. Also examples of the silane coupling agent include trimethoxycaprylylsilane (trimethoxy-n-octylsilane), and octadecyltrichlorosilane.

Formation of a water-repellent coating film on the substrate particles and surface modification treatment thereon mentioned above can be carried out according to an ordinary method.

Commercial products of water-repellent fine particles include Microdispers-200 (by Techno Chemical Corporation), AEROSIL RY200, AEROSIL RY300, and AEROSIL R805 (all by Evonik Corporation), and Ketjen Black (by Lion Specialty Chemicals Corporation).

One alone or two or more kinds of the above-mentioned water-repellent fine particles can be used either singly or as combined.

(Other Fine Particles)

The fine particles having a primary particle diameter of 1000 nm or less that are used in the present invention are not limited to water-repellent fine particles but may be any other fine particles than water-repellent fine particles, that is, fine particles having a water contact angle of less than 70° are also usable as a filler. Water-repellent fine particles can be combined with fine particles having a water contact angle of less than 70° for use herein. Fine particles having a water contact angle of less than 70° may be those having a water contact angle of 50° or less, or 30° or less, or 10° or less. The lower limit of the water contact angle of fine particles is 0°.

As other fine particles than water-repellent fine particles, there are also mentioned particles formed of an inorganic compound of a metal element or a semimetal element described as examples of the substrate particles for the coating film-having fine particles and surface-treated fine particles in the section of (Water-Repellent Fine Particles) given hereinabove, and also organic particles, and particles of silicon oxide are preferably used. These inorganic particles and organic particles may have a coating film of an organic compound on the surfaces thereof, or may have an organic functional group introduced thereinto.

Commercial products of the other fine particles than water-repellent fine particles include AEROSIL 200 (by Evonik Corporation).

(Specific Surface Area of Fine Particles)

The specific surface area of the fine particles used in the present invention is preferably 1 to 300 $m^2/g$, more preferably 2.5 to 2750 $m^2/g$, even more preferably 5 to 2500 $m^2/g$. With that, the gas diffusion phase is more reliably formed in a molded body of the gas absorbing material, and the gas absorption rate and the gas diffusion rate tend to be further improved.

The specific surface area of the fine particles can be measured according to a BET method.

[Particle Size Ratio and Amount Ratio of Amino Group-Having Polymer Compound Particles to Fine Particles Having a Primary Particle Diameter of 100 nm or Less]

Preferably, the average primary particle diameter of the fine particles having a primary particle diameter of 1000 nm or less is smaller than the median diameter of the amino group-having polymer compound particles in a dry state. Specifically, the average primary particle diameter of the fine particles is preferably 1/3 to 1/100000 of the median diameter of the amino group-having polymer compound particles in a dry state, more preferably 1/10 to 1/100000, even more preferably 1/20 to 1/50000, further more preferably 1/25 to 1/1000, further more preferably 1/50 to 1/900, most preferably 1/100 to 1/800.

For effectively forming the gas diffusion phase, preferably, the amount of the fine particles is enough to cover the surfaces of the polymer compound particles. Also so as not to lower the gas absorption amount per weight of the gas-absorbing material, the blending ratio of the fine particles is as small as possible. That is, it is preferable to add the minimum necessary amount of the fine particles in order to cover the surfaces as thin as possible. The amino group-having polymer compound particles having a larger particle diameter are to have a smaller surface area per weight. Consequently, a preferred blending amount of the fine particles greatly fluctuates depending on the particle diameter of the amino group-having polymer compound particles. When the particle diameter of the amino group-having polymer compound particles is 10 μm or less, the ratio by weight as a solid content of the amino group-having polymer compound particles to the fine particles (amino group-having polymer compound particles/fine particles) is preferably 95/5 to 5/95, more preferably 90/10 to 30/70, even more preferably 80/20 to 50/50. Also preferably, the content of the amino group-having polymer compound particles in the gas-absorbing material is, as a solid content, larger than the content of the water-repellent particles. In the case where the amino group-having polymer compound particles are gel particles and when the fine particles are added to the gel as an aggregate of the gel particles or a ground product of the gel, the volume, the bulk becomes small (the filling amount becomes large) as compared with the case where the fine particles are not added, and the reversible gas absorption performance is therefore improved. The particle diameter of the amino group-having polymer compound particles in effectively attaining such an effect is relatively large, and is, for example, 10 μm or more, and accordingly, the necessary blending ratio of the fine particles is relatively small, that is, the ratio by volume of the gel or the ground gel product to the fine particles (gel or ground gel product/fine particles) is preferably 99.9/0.1 to 95/5, more preferably 99.75/0.25 to 98/2, even more preferably 99.5/0.5 to 98.5/1.5.

When the particle size ratio and the amount ratio of the amino group-having polymer compound particles to the fine particles each are controlled to fall within the above range, the gas absorption/desorption speed tends to be higher.

[Other Components]

The gas-absorbing material may be composed of only the amino group-having polymer compound particles and the fine particles having a primary particle diameter of 1000 nm or less, but may contain any other components. The other components include polymer compounds except the amino group-having polymer compound particles, and additives.

(Polymer Compound Except Amino Group-Having Polymer Compound Particles)

In this description, the "polymer compound except the amino group-having polymer compound particles" includes particles of a polymer compound not having an amino group, an amino group-having polymer compound not forming particles, and a polymer compound not forming particles and not having an amino group.

The polymer compound except the amino group-having polymer compound particles is, though not specifically limited thereto, preferably a polymer compound reactive to stimulus such as temperature change. Reaction to stimulus includes change in an acid dissociation constant of a functional group, change in a steric structure, change in a swelling degree, change in a hydrophilicity, change in a water content, change in an water absorption, change in an amount of a dissolved bicarbonate ion, and change in an amount of a dissolved hydrogen sulfide ion. Preferably, the compound has an amino group such that the acid dissociation constant of the conjugated acid is planned. Especially preferably, for dissolving carbon dioxide, the acid dissociation constant of the amino group is equal to or larger than the acid dissociation constant of carbonic acid. Above all, a secondary or tertiary amino group is preferred, and a tertiary amino group is more preferred. Even more preferred is a dialkylamino group such as a dimethylamino group. The amino group of the polymer compound may bond to the main chain, or may bond to the side chain, but preferably bonds to the side chain.

(Additives)

The additives include a film stabilizer, an absorption accelerator, a desorption accelerator, a hygroscopic agent, and an antioxidant.

The film stabilizer includes a polymer compound, a polymerizable molecule (polymerizable compound), a crosslinking agent such as a titanium crosslinking agent, a primary amine, a secondary amine and a tertiary amine. Among these, as the polymer compound, preferred are a polymer compound having a primary amino group such as a polyvinyl amine a polymer compound having a secondary amino group, a polymer compound having a tertiary amino group, a compound having a quaternary ammonium group, a polymer compound having plural kinds of a primary amino group, a secondary amino group, a tertiary amino group and a quaternary ammonium group, a polyvinyl alcohol, a polyethylene, and a polyvinyl alcohol/polyethylene copolymer.

In the case where a polymerizable molecule is used as a film stabilizer, the molecule of the compound undergoes polymerization reaction in a film and the resultant polymer compound also functions as a film stabilizer. With that, even after addition of water or gas absorption/desorption after film formation, the film does not swell excessively and can readily maintain a uniform film condition. The polymerizable molecule can be a monomer having a polymerizable group, and examples thereof include a (meth)acryl monomer. Above all, a (meth)acrylamide or a (meth)acrylamide derivative is preferably used. For example, the polymerizable molecule includes an alkylacrylamide, a substituted or unsubstituted aminoalkyl(meth)acrylamide, and an acrylamide derivative having 2 polymerizable groups, and among these, a substituted aminoalkylacrylamide and an acrylamide derivative having 2 polymerizable groups are preferably used. Preferably, a substituted aminoalkylacrylamide and an acrylamide derivative having 2 polymerizable groups are used as combined, and the molar fraction of these is preferably (60 to 99)/(40 to 1), more preferably (80 to 99)/(20 to 1), even more preferably (90 to 99)/(10 to 1). Specific examples of the polymerizable group-having monomer include N-isopropylacrylamide (NIPAM), tert-butylacrylamide (TBAM), N,N-dimethylaminopropylmethacrylamide (DMAPM), N,N'-methylenebisacrylamide (BIS), and acrylamide. One alone or two or more kinds of these polymerizable compounds can be used either singly or as combined. In the case where these are used as combined, for example, a preferred combination is N,N-dimethylaminopropylmethacrylamide (DMAPM) and N,N'-methylenebisacrylamide (BIS).

The content of the film stabilizer in the gas-absorbing material of the present invention is preferably 1 to 89% by mass relative to the total amount of the gas-absorbing material.

The absorption accelerator is a compound having a function of accelerating absorption of an acidic gas by the gas-absorbing material of the present invention. The desorption accelerator is a compound having a function of accelerating desorption of the acidic gas from the gas-absorbing material. In the present invention, an absorption/desorption accelerator having both functions of an absorption accelerator and a desorption accelerator may be used. These absorption accelerator, desorption accelerator and absorption/desorption accelerator each may additionally have a function as a film stabilizer. The total content of the absorption accelerator, the desorption accelerator and the absorption/desorption accelerator in the gas-absorbing material of the present invention is preferably 0.05 mL or more per g of the solid content of the material, more preferably 0.1 mL or more. The content of the absorption accelerator in the gas-absorbing material of the present invention is, as an amine concentration, preferably 0.1 to 12 N, more preferably 1 to 10 N, even more preferably 3 to 9 N.

As the absorption accelerator, the desorption accelerator and the absorption/desorption accelerator, a low-molecular amine is preferably used. The molecular weight of the low-molecular amine is preferably 61 to 10000, more preferably 75 to 1000, even more preferably 90 to 500. The boiling point of the low-molecular amine is preferably 80° C. or higher, as usable for long and as practicable, more preferably 120° C. or higher, even more preferably 150° C. or higher. For boiling point elevation, an amine-containing compound having a moiety of forming a salt with a counter ion and capable of being a liquid, such as an ionic liquid, may also be used.

The low-molecular amine may contain any of a primary amino group, a secondary amino group, a tertiary amino group, an ammonium group and an imidazolium group, may contain plural amino groups, ammonium groups and imidazolium groups, and preferably contain 1 to 3 such groups. The secondary amino group and the tertiary amino group may be a cyclic amino group. The low-molecular amine may further contain any other functional group than an amino group, an ammonium group and an imidazolium group, and for example, may contain a hydroxy group. The number of the hydroxy groups that may be contained in the low-molecular amine is preferably 0 to 2. Preferred examples of the low-molecular amine include an amine having an amino group and a hydroxy group, and an amine having 3 amino groups. More preferred examples of the low-molecular amine include an amine having a secondary amino group and a hydroxy group. An amine having a boiling point of 150° C. or higher and having a secondary amine group and a hydroxy group is especially preferred from the viewpoint that the amine of the type can especially exponentially increase the desorption amount of an acidic gas in a high concentration range, and is suitable for repeated use.

Specific examples of the low-molecular amine include compounds represented by the following formulae.

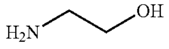

Ethanol Amine
(ETA)

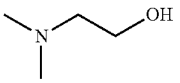

2-(Dimethylamino)ethanol
(DMAE)

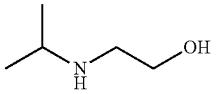

Iso propyl amino ethanol
(IPAE)

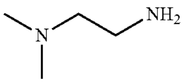

2-(Dimethylamino)ethylamine
(DMAEA)

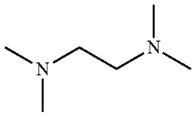

Tetramethylethylenediamine
(TMEDA)

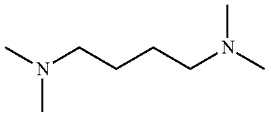

Tetramethylenediaminobutane
(TM-1.4-DAB)

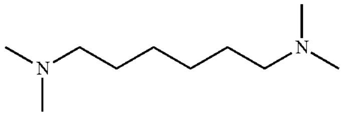

N,N,N',N'-Tetramethyl-1,6-hexanediamine
(TMHDA)

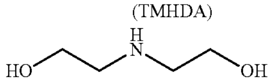

Diethanolamine
(DEOA)

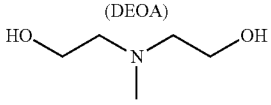

N-Methyldiethanolamine
(MDEOA)

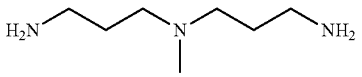

Diamino-N-methyl dipropyl amine
(DAMDPA)

-continued

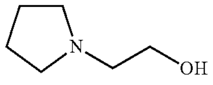

1-2 Hydroxy ethyle pyrrolidine
(1-2HE-PRLD)

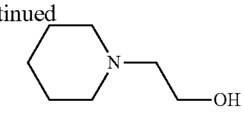

1-2 Hydroxyethylepiperidine
(1-2HE-PP)

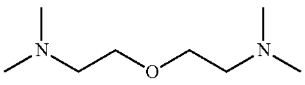

Bis(2-dimethylaminoethyl) ether
(Bis(2DMAE)ER)

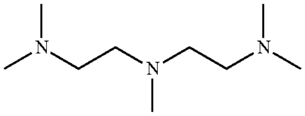

Pentamethyldiethylenetriamin
e (PMDETA)

Among these, in particular, use of DMAE, IPAE, Bis (2DMAE)ER, 1-2HE-PRLD, 1-2HE-PP, TM-1,4-DAB, TMHAD and PMDETA is preferred as they can increase the acidic gas desorption amount. Above all, use of IPAE, Bis(2DMAE)ER, 1-2HE-PP, TM-1,4-DAB, TMHAD and PMDETA is more preferred as they have a relatively high boiling point and hardly evaporate. Use of IPAE, TM-1,4-DAB, TMHAD and PMDETA is even more preferred as the acidic gas desorption amount can be significantly increased by increasing the concentration of the compound, and use of IPAE, TMHAD and PMDETA is especially preferred as easily available.

The hygroscopic agent usable as an additive is preferably one that can have a relative humidity of 90% or less at 25° C. when formed into a saturated aqueous solution thereof. Such hygroscopic agents include ions such as a bromide ion, a chloride ion, an acetate ion, a carbonate ion, a bicarbonate ion, a lithium ion, a potassium ion, a calcium ion, a magnesium ion, and a sodium ion. As such hygroscopic agents, also usable are salts such as lithium bromide, lithium chloride, calcium chloride, potassium acetate, magnesium chloride, potassium carbonate, and sodium carbonate. In the case where a hygroscopic agent is added, the amount thereof to be added is preferably 0.01 to 10% by mass relative to the total amount of the gas-absorbing material.

The antioxidant usable as an additive is one capable of suppressing or preventing oxidation by addition thereof. Such antioxidants include vitamin C (ascorbic acid), vitamin E (tocopherol), BHT (dibutylhydroxytoluene), BHA (butylhydroxyanisole), sodium erythorbate, propyl gallate, sodium sulfite, sulfur dioxide, hydroquinone and derivatives thereof. In the case where an antioxidant is added, the amount thereof to be added is preferably 0.01 to 10% by mass relative to the total amount of the gas-absorbing material.

One alone or two or more kinds of the above-mentioned additives can be used either singly or as combined.

[Use Mode of Gas-Absorbing Material]

The gas-absorbing material of the present invention can be used by filling it into a container such as a column, or may be used by molding it into a desired shape by pressure-powder molding, granulation molding, or kneading molding. Regarding the description of pressure-powder molding, granulation molding and kneading molding, reference may be made to the corresponding description in the section of <Gas Absorbent> given hereunder.

Also the gas-absorbing material can be used by immersing it in a liquid. With that, the amino group-having polymer compound particles swell and gel to be in a state capable of readily absorbing an acidic gas. The method of immersion in a liquid is not specifically limited, and for example, a liquid may be applied to the gas-absorbing material filled in a column so as to be infiltrated into the material, or the gas-absorbing material or a molded article thereof may be put in an environment where a substance targeted for infiltration has been vaporized so that the substance can be infiltrated into the the gas-absorbing material or a molded article thereof. For example, in the case where the targeted substance for infiltration is water, the gas-absorbing material or a molded article thereof may be put in a high-humidity environment and water can be therefore infiltrated into the the gas-absorbing material or a molded article thereof.

The liquid to be infiltrated into the gas-absorbing material includes, though not specifically limited thereto, polar solvents such as water, methanol, ethanol, isopropanol, acetonitrile, N,N-dimethylformamide and dimethyl sulfoxide, and a mixed solvent prepared by combining two or more kinds of these polar solvents is also usable. Above all, water or a mixed solvent of water and any other polar solvent is preferably used. With that, the amino group-having polymer compound particles become hydrogel particles.

The water content in the hydrogel particles is preferably 0.05 mL or more per gram of the solid content, more preferably 0.1 mL Or more. Also preferably, the water content in the hydrogel particles is 20 mL or less per gram of the solid content, more preferably 10 mL or less.

The target gas to be absorbed by the gas-absorbing material of the present invention may be any one such that the target gas or the ion derived from the target gas can interact with an amino group, and examples thereof include an acidic gas such as carbon dioxide and hydrogen sulfide. In carbon dioxide, the bicarbonate ion formed by reaction with a hydroxide ion can react with an amino group and the gas is thereby absorbed by the polymer compound particles in the gas-absorbing material of the present invention.

Switching between the gas absorption process and the gas desorption process for the gas-absorbing material can be performed by a temperature change or a partial pressure change of the target gas. For example, the gas-absorbing material swollen with water is highly basic and is in a state of readily absorbing carbon dioxide at 30 to 50° C. After the gas-absorbing material has absorbed carbon dioxide at that temperature and is then heated at 60 to 90° C., its basicity lowers and the material desorbs the absorbed carbon dioxide. Or after the gas-absorbing material has absorbed carbon dioxide and then a nitrogen gas not containing carbon dioxide is introduced thereinto, the material can also desorb carbon dioxide.

<Production Method for Gas-Absorbing Material>

The gas-absorbing material of the present invention can be produced by mixing amino group-having polymer compound particles, fine particles having a primary particle diameter of 1000 nm or less, and other optional components. Preferably, these materials are mixed in a dry mixing mode of mixing the materials in a dry state. In that manner, a gas-absorbing material capable of sufficiently forming a gas diffusion phase can be produced.

Dry mixing can be carried out, for example, using an oval rotor-type stirring apparatus, a fluidized bed granulation apparatus, a planetary milling apparatus, a ball mill or a stirring granulation apparatus.

<Gas Absorbent>

Next, the gas absorbent of the present invention is described.

The gas absorbent of the present invention contains powder compaction-molded article of the gas-absorbing material of the present invention. Also the gas absorbent of the present invention contains granulated particles of the gas-absorbing material of the present invention. Further, the gas absorbent of the present invention is formed of a shaped article of a mixture containing the gas-absorbing material of the present invention and a thermoplastic resin. In the following description, these gas absorbents will be referred to as a first gas absorbent, a second gas absorbent and a third gas absorbent in the order described above. Regarding the first to third gas absorbents, reference may be made to the description in the section of <Gas-Absorbing Material>.

In the following, the first to third gas absorbents are described in that order.

[First Gas Absorbent]

The first gas absorbent contains a powder compaction-molded article of the gas-absorbing material of the present invention.

The powder compaction-molded article of a bas-absorbing material contains amino group-having polymer compound particles at a high density, and has a pore structure of fine particles having a primary particle diameter of 1000 nm or less between the polymer compound particles, in which the pore structure effectively functions as a gas diffusion phase. Therefore, the powder compaction-molded article has a high gas absorption/desorption speed and exhibits excellent reversible gas absorption performance.

Preferably, the powder compaction-molded article of a bas-absorbing material is produced using a step of putting a composite material produced by mixing amino group-having polymer compound particles and fine particles into a forming mold, and pressure-forming it therein.

The pressure in powder compaction-molding for the gas absorbent is preferably 0.1 to 2000 kg/cm$^2$, more preferably 1 to 1500 kg/cm$^2$, even more preferably 10 to 1000 kg/cm$^2$.

Configuration and Characteristics of Powder Compaction-Molded Article of Gas-Absorbing Material The powder compaction-molded article formed of a gas-absorbing material preferably has the following configuration and characteristics.

(Density of Powder Compaction-Molded Article)

The density of the powder compaction-molded article is preferably 0.01 to 10.0 g/cm$^3$, more preferably 0.05 to 7.5 g/cm$^3$, even more preferably 0.1 to 5.0 g/cm$^3$. The powder compaction-molded article having a density that falls within the above range is presumed to have pores formed at an appropriate occupancy rate, and therefore can more improve the gas absorption/desorption speed.

The density of the powder compaction-molded article can be measured with a dry-type automatic densitometer.

(Thickness of Powder Compaction-Molded Article)

The length in the compression direction (thickness) of the powder compaction-molded article is preferably 1 μm to 10000 μm, more preferably 5 μm to 5000 μm, even more preferably 10 μm to 1000 μm.

The thickness of the powder compaction-molded article can be measured with a micrometer caliper or a laser microscope or through scanning electron microscope observation.

(Shape of Powder Compaction-Molded Article)

The shape of the powder compaction-molded article is not specifically limited and can be appropriately selected depending on the intended use. For example, a film and a cylinder are shapes easy to use. In the case where the powder compaction-molded article is in the form of a film, it may have a single-layer structure or may have a multilayer structure formed by laminating plural films. In the case of a multilayer structure, at least the films in contact with each other preferably have different conditions of a material, a blending ratio and a thickness. Preferably, the films constituting the multilayer structure each have a thickness falling within the above-mentioned suitable thickness range.

(Nitrogen Permeation Flux through Powder Compaction-Molded Article)

The powder compaction-molded article preferably has a nitrogen permeation flux at 40° C. of 100 GPU or less, more preferably 10 GPU or less. Also preferably, the powder compaction-molded article has a carbon dioxide permeation flux at 40° C. of 10 GPU or more, more preferably 100 GPU or more. The powder compaction-molded article having a nitrogen permeation flux and a carbon dioxide permeation flux each falling within the above range can selective permeate carbon dioxide relative to nitrogen, and therefore when used as a gas separator to be mentioned hereinunder, the powder compaction-molded article can selectively separate carbon dioxide from a mixed gas such as air containing nitrogen and carbon dioxide, and efficiently recover the separated carbon dioxide.

In this description, "permeation flux" is a value to be calculated according to the following formula (1).

$$Q=L/A\times\Delta P \qquad (1)$$

In the formula (1), Q represents a permeation flux, L represents a permeation flow rate per unit time, A represents a film area, ΔP represents a partial pressure difference between both sides of a single-layer film. The permeation flow rate L can be measured as an amount of a gas having passed through a film per unit time by gas chromatography. The unit of the permeation flux Q is GPU. (1 GPU is $1.0\times10^{-6}$ ($cm^3$ (STP)/($s\cdot cm^2\cdot cmHg$)).) For the partial pressure difference ΔP, the gas partial pressure on the gas supply surface side and the gas partial pressure on the gas permeation surface side are measured by manometry and gas chromatography, and a difference between the two is calculated to be the partial pressure difference ΔP.

Also in this description, "selectivity" is a value of a ratio $Q_S/Q_O$ in which the numerator $Q_S$ is a permeation flux of a selectively permeating gas and the denominator $Q_O$ is a permeation flux of the other gases.

[Second Gas Absorbent]

The second gas absorbent contains granulated particles of the gas-absorbing material of the present invention.

Here, the "granulated particles of the gas-absorbing material" mean particles produced by granulating the gas-absorbing material of the present invention with a granulator.

For granulation of the gas-absorbing material, any mode of dry granulation or wet granulation is employable, but dry granulation is preferred.

The target for granulation may be a gas-absorbing material alone or may also be a mixture of a gas-absorbing material and any other material. One example of the other material is a filler. The filler may be a known one. Examples thereof include active carbon, zeolite; oxides such as silica, fumed silica, hydrophobized silica, hydrophobized fumed silica, water-repellent silica, alumina, hydrophobized alumina, water-repellent alumina, boehmite, diatomaceous earth, titanium oxide, iron oxide, zinc oxide, magnesium oxide, and metal ferrite; hydroxides such as aluminum hydroxide and magnesium hydroxide; carbonates such as calcium carbonate (light, heavy), magnesium carbonate, dolomite, and dawsonite; sulfates or sulfites such as calcium sulfate, barium sulfate, ammonium sulfate, and calcium sulfite; silicates such as talc, mica, clay, glass fibers, calcium silicate, montmorillonite, and bentonite; borates such as zinc borate, barium metaborate, aluminum borate, calcium borate, and sodium borate; carbons such as carbon black, hydrophobized carbon black, water-repellent carbon black, graphite, and carbon fibers; other iron powder, copper powder, aluminum powder, zinc flower, molybdenum sulfide, boron fibers, potassium titanate, lead titanate zirconate, fluororesin powder, and Teflon (registered trademark) powder. Above all, preferred is use of water-repellent fillers. The other material includes water-repellent materials such as carbon black, silica particles, mesoporous silica, PTFE (polytetrafluoroethylene) particles, metal/inorganic oxide particles, zeolite, active carbon, low-molecular amine compounds, and amine-containing polymers. In particular, a low-molecular amine or an amine-containing polymer is preferably used as effective for improving performance.

The granulated particles of the gas-absorbing material may contain a binder. Preferably, the binder is sprayed over the gas-absorbing material in granulating the gas-absorbing material. With that, the gas-absorbing material is prevented from scattering and the handleability thereof is thereby improved. As the binder, usable is one generally used for granulation, and in addition, a solution of an amino group-having polymer is also usable.

As the granulator, usable herein are a stirring and mixing granulator, an extrusion granulator, and a pan granulator.

The average primary particle diameter of the granulated particles of the gas-absorbing material is preferably 0.1 μm to 10 mm, more preferably 0.25 μm to 7.5 mm, even more preferably 0.5 μm to 5.0 mm.

The average primary particle diameter of the granulated particles can be measured with a laser diffraction particle diameter distribution measuring device or an optical microscope.

[Third Gas Absorbent]

The third gas absorbent is formed of a shaped article of a mixture that contains the gas-absorbing material of the present invention and a thermoplastic resin.

Here, the thermoplastic resin that the mixture contains is not specifically limited, and examples thereof include a polyolefin such as polyethylene and polypropylene, and a polyamide, a polystyrene, a polyimide, an acrylic resin, a thermoplastic polyurethane, a polyvinyl alcohol, a polyvinylpyrrolidone, and a polyethylene oxide.

The content of the thermoplastic resin in the mixture is preferably 1 vol % to 99 vol %, more preferably 5 vol % to 95 vol %, even more preferably 10 vol % to 90 vol %.

The mixture can be prepared by kneading a gas-absorbing material and a thermoplastic resin with a kneader. At that time, the gas-absorbing material may be subjected to kneading as it is, or may be subjected to kneading as granulated particles thereof.

Regarding the description of the "granulated particles", reference may be made to the description in the section of [Second Gas Absorbent] given hereinabove.

The mixture may contain only the gas-absorbent material of the present invention and a thermoplastic resin, and may additionally contain any other material. One example of the other material is a filler, and above all, a water-repellent filler is preferably used. As the other material, there is mentioned a water-repellent material such as carbon black, silica particles, mesoporous silica, PTFE particles, metal/inorganic oxide particles, zeolite, active carbon, low-molecular amine compounds and amine-containing polymers. In particular, a low-molecular amine or an amine-containing polymer is preferably used as effective for improving performance.

As a kneader for kneading the mixture, usable are a twin-screw kneader, a kneader extruder, and a single-screw extruder.

Regarding the description of the thickness and the shape of the molded article, reference may be made to the description of the section of (Thickness of Powder Compaction-Molded Article) and (Shape of Powder Compaction-Molded Article) given hereinabove. The molded article may be pellets. The average particle size of the pellets is preferably 0.5 to 10 mm, more preferably 1 to 4.5 mm, even more preferably 1.5 to 3 mm. The average particle size of the pellets is a value calculated by measuring the maximum diameter of each of 100 pellets and dividing the resultant data by the number of the measured pellets.

[Total Pore Volume and Average Pore Diameter of Gas Absorbent]

Preferably, the first gas absorbent and the third gas absorbent each have a total pore volume of 0.01 to 10 $cm^3/g$, more preferably 0.01 to 5 $cm^3/g$, even more preferably 0.01 to 2.5 $cm^3/g$.

Also preferably, the first gas absorbent and the third gas absorbent each have an average pore diameter of 0.1 to 500 nm, more preferably 0.1 to 300 nm, even more preferably 0.1 to 150 nm.

The total pore volume of the gas absorbent can be measured according to a BET method, and the average pore diameter can be determined through analysis by the Kelvin law.

When the total pore volume and the average pore diameter of the gas absorbent each fall within the above range, gas diffusion can be attained efficiently inside the gas absorbent to achieve efficient gas absorption/desorption.

[Other Parts of Gas Absorbent]

The gas absorbent of the present invention may be composed of a pressure powder-molded article of the gas-absorbing material, or may additionally contain any other part.

The other part includes a carrier to carry the pressure powder-molded article. As the carrier, usable is a thin plate or a porous material. As the thin plate to be the carrier, usable are a resin film, a metal foil, a carbon material sheet and a carbon sheet; and as the porous material, usable is a porous material formed of resin, metal or carbon, or a fiber aggregate.

<Gas Separator>

Next, the gas separator of the present invention is described.

The gas separator of the present invention is characterized by containing the gas-absorbent material of the present invention. The gas-absorbing material that the gas separator contains may constitute the gas absorbent of the present invention.

Regarding the description of the gas-absorbing material and the gas absorbent of the present invention, reference may be made to the description in the section of <Gas-Absorbing Material> and <Gas Absorbent> given hereinabove.

The mixed gas to be subjected to gas separation with the gas separator of the present invention includes a natural gas, a biogas, a landfill gas, a burnt gas, a fuel gas and a gas after steam reforming. Using the gas separator of the present invention, for example, carbon dioxide can be separated from these mixed gases at high selectivity and for a short period of time to significantly lower the concentration of carbon dioxide in the resultant mixed gases.

Not limited to gas, water or water vapor may be made to permeate through the gas separator of the present invention. Accordingly, it is possible to separate water or water vapor from water or water vapor that contains a gas, in other words, a gas can be removed from water or water vapor.

The condition in gas separation varies depending on various conditions of the gas-absorbing material for use for the gas separator, the composition of the mixed gas to be subjected to gas separation, and the separation-targeted gas to be separated from a mixed gas, and is preferably 0 to 130° C., more preferably 0 to 95° C., and even more preferably, gas separation is carried out at a temperature of 10 to 60° C. The water content in the gas-absorbing material in gas separation is preferably 1% by mass to 1000% by mass of the dry film weight.

<Filter and Gas Separation Unit>

The filter and the gas separation unit of the present invention are characterized by having the gas separator of the present invention.

Regarding the description and the preferred range of the gas separator of the present invention, reference may be made to the contents described in the section of <Gas Separator>.

The filter and the gas separation unit of the present invention use the gas separator of the present invention and therefore can efficiently separate and recover a specific gas from a mixed gas.

EXAMPLES

The characteristics of the invention are described specifically with reference to the following Examples and Comparative Examples, in which the material used, its amount and ratio, the details of the treatment and the treatment process may be suitably modified or changed not overstepping the spirit and the scope of the invention. Accordingly, the invention should not be limitatively interpreted by the specific examples mentioned below. The water contact angle and the average primary particle diameter of particles were measured according to the method described in [Fine Particles having primary particle diameter of 1000 nm or less]. The specific surface area and the total pore volume shown in Table 2 below were measured according to a BET method, and the average pore diameter was determined through analysis by the Kelvin law.

(Synthesis Example 1) Synthesis of Amino Group-Containing Polymer Particles 1

The amino group-containing polymer particles 1 used in the present Examples were synthesized as follows.

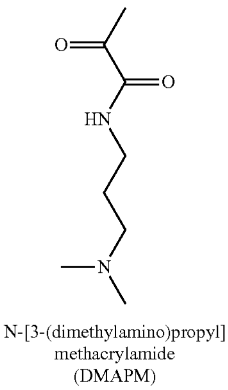

N-[3-(dimethylamino)propyl] methacrylamide (DMAPM)

55 mol %

+

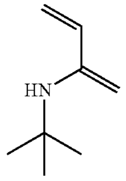

N-tert-butylacrylamide (TBAm)

43 mol %

+

-continued

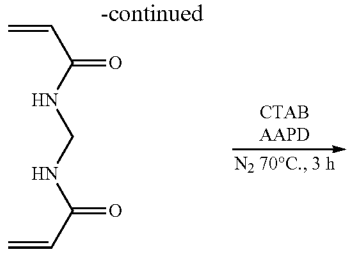

N, N-methylenebisacrylamide
(Bis)

2 mol %

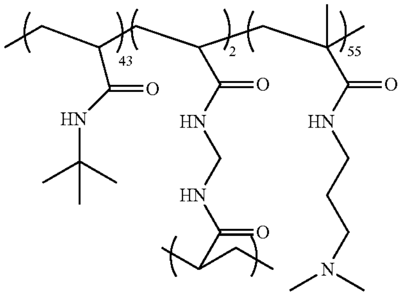

One liter of pure water was put into a 2-liter three-neck flask, heated up to 70° C., and 2 mM surfactant (cetyltrimethylammonium bromide) and three kinds of monomers were dissolved therein so that the total monomer concentration could be 312 mM. The composition of the three kinds of monomers was 55 mol % N-(dimethylaminopropyl)methacrylamide, 43 mol % N-tert-butylacrylamide and 2 mol % N,N'-methylenebisacrylamide. Before use herein, N-(dimethylaminopropyl)methacrylamide was processed in an aluminum column to remove a polymerization inhibitor. N-tert-butylacrylamide was previously dissolved in a small amount of methanol to be a 0.68 g/mL solution, and used here. While kept at 70° C., the mixture was stirred with a mechanical stirrer, and bubbled with nitrogen for 1 hour to remove oxygen from the system. A solution prepared by dissolving 700 mg of 2,2'-azobis(2-methylpropionamidine) dihydrochloride in 5 mL of pure water was added to the resultant monomer solution, and in a nitrogen atmosphere, this was reacted at 70° C. for 3 hours. After the reaction, the precipitate was taken out by filtration and dialyzed through a dialysis membrane (MWCO12-14.000, width: 75 mm, vol/length: 18 mL/mL) [by Spectrum Laboratories Corporation] for 3 days to remove the unreacted monomers and the surfactant, and then the counter anion was removed with a strong basic ion-exchange resin. A suspension of the gel particles produced according to the above process was dried according to a spray-drying method to give amino group-having polymer compound particles (amino group-containing polymer particles 1). The particle diameter of the amino group-containing polymer particles 1 in a dry state was 4 μm as a median diameter measured with a laser diffraction particle diameter distribution measuring device. The water contact angle of the amino group-containing polymer particles was 66.2°.

(Synthesis Example 2) Synthesis of Amino Group-Containing Polymer Particles 2

Dimethylaminopropylacrylamide (DMAPAAm: 95 mol %) and BIS (15 mol %) were dissolved in MilliQ water at 60° C. to give an aqueous solution having a total amount of 30 mL, then ethanol was added thereto to prepare a mixture in such a manner that the total monomer concentration in the reaction mixture to be processed in the subsequent step could be 2.3 mol/L. The mixture was heated up to 70° C., and then bubbled with nitrogen for 30 to 60 minutes with stirring. An AIBN solution (AIBN concentration in the reaction mixture: 2.58 mM, solvent: mixed solvent of acetone and water) was added to the mixture to give a reaction mixture, which was polymerized in a mode of bulk polymerization in a nitrogen stream atmosphere at 70° C. for 3 hours to give a mass of gel. This was ground with a meat chopper (4.5 mm-opening), then washed with water, and the washing solution was removed by filtration to give amino group-containing polymer particles 2. The water content in the amino group-containing polymer particles was 73.7% by weight.

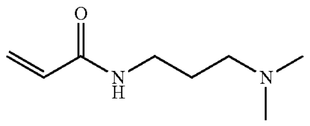

DMAPPAm
(N-[3-(Dimethylamino)propyl]acrylamide)

(Fine Particles Having a Primary Particle Diameter of 1000 nm or Less Used in Examples)

The fine particles used in Examples, and the constitution, the water contact angle and the average primary particle diameter of the fine particles are shown in Table 1.

TABLE 1

| Name of Fine Particles | Constitution of Fine Particles | Water Contact Angle (°) | Average Primary Particle Diameter (nm) |
|---|---|---|---|
| Carbon Black (CB) | Acetylene Black (by Denka Company Ltd.)<br>specific surface area: 68 $m^2/g$<br>iodine absorption amount: 92 mg/g<br>bulk density: 0.04 g/mL | 105.0 | 30 |
| Water-Repellent Carbon Black (water-repellent CB) | The above carbon black was surface-modified with trimethoxycaprylylsilane. | 122.9 | 30 |
| Water-Repellent Silica RY200 | AEROSIL RY200 (by Evonik Corporation)<br>$SiO_2$ particles were surface-modified with dimethylsiloxane. | 154.1 | 12 |
| Water-Repellent Silica RY300 | AEROSIL RY300 (by Evonik Corporation)<br>$SiO_2$ particles were surface-modified with dimethylsiloxane. | 154 | 7 |
| Water-Repellent Silica R805 | AEROSIL R805 (by Evonik Corporation)<br>An alkyl group was introduced into the surfaces of $SiO_2$ particles. | 153.2 | 12 |

TABLE 1-continued

| Name of Fine Particles | Constitution of Fine Particles | Water Contact Angle (°) | Average Primary Particle Diameter (nm) |
|---|---|---|---|
| PTFE Particles | Microdispers-200 (by Techno Chemical Corporation) polytetrafluoroethylene particles surface area: 10 $m^2/g$ (by BET method) molecular weight: 8 × $10^4$ melting point: 320 to 325° C. | 94.8 | 200 |
| Hydrophilic Silica 200 | AEROSIL 200 (by Evonik Corporation) $SiO_2$ particles | 10 or less | 12 |
| DK BLACK | OTS-8 DK BLACK (by Daito Kasei Kogyo Co., Ltd.) Carbon black was surface-modified with octadecyltrichlorosilane. | 122.9 | 30 |

[1] Evaluation of Reversible $CO_2$ Absorption Performance

In the present Examples, the reversible $CO_2$ absorption performance was evaluated according to a pressure swing absorption method: PSA method) and a temperature swing absorption method: TSA method).

(Evaluation of Reversible $CO_2$ Absorption Performance by Pressure Swing Absorption Method)

The reversible $CO_2$ absorption performance was evaluated according to the following pressure swing absorption method.

First, a sample targeted for measurement put in a reactor was fully humidified in a constant-temperature bath at a temperature of 40° C. and a relative humidity of more than 98%, and then the temperature thereof was conditioned at 30° C. Subsequently, a humidified mixed gas of $CO_2$ and $N_2$ ($CO_2$ concentration: 10.03% by volume) was applied to the sample targeted for measurement at a flow rate of 200 mL/min and the gas desorbed from the sample was analyzed to measure the $CO_2$ concentration (A) thereof, using a multi-gas analyzer (VA-3000, by Horiba, Ltd.) (absorption step). Next, the gas to be applied to the sample was changed to a humidified $N_2$ gas and the gas was applied to the sample at a flow rate of 200 mL/min, and the $CO_2$ concentration (A) of the gas desorbed from the sample was measured (desorption step). An integrated value of the difference between the $CO_2$ concentration of the applied mixed gas and the $CO_2$ concentration (A) measured in the absorption step is referred to as a $CO_2$ absorption amount, and an integrated value of the $CO_2$ concentration (B) measured in the desorption step is referred to as a $CO_2$ desorption amount. From these, the reversible $CO_2$ absorption performance of the sample was evaluated. In showing the $CO_2$ absorption amount measured here on graphs, the value A may be shown on the minus side of the vertical axis by a reference numeral "–", in order to distinguish the measured $CO_2$ absorption amount from the $CO_2$ desorption amount.

(Example 1) Production of Gas Absorbent 1 Using Amino Group-Containing Polymer Particles 1 and Carbon Black Amino group-containing polymer particles 1 and carbon black shown in Table 1 were mixed at room temperature at a ratio by volume of amino group-containing polymer particles 1/carbon black=7/3, and further mixed in a planetary milling device with 2-mm zirconia beads therein at 300 rpm for 10 minutes to give a composite material of amino group-containing polymer particle 1 and carbon black (gas-absorbing material 1).

A SEM photograph (magnification: 3700×) of the amino group-containing polymer particles 1 before adding carbon black thereto is shown in FIG. 1(*a*), and a SEM photograph (magnification: 3700×) of the composite material (gas-absorbing material 1) prepared by mixing the amino group-containing polymer particles 1 and carbon black is shown in FIG. 1(*b*). From the SEM photograph of the composite material in FIG. 1(*b*), it is confirmed that the surfaces of the amino group-containing polymer particles 1 are covered with small particles (carbon black).

Next, the gas-absorbing material 1 was put into a reactor (width×depth×height: 15 cm×8 cm×0.2 cm), and compaction-molded at room temperature under 5000 kg/120 $cm^2$ to give a filmy gas absorbent 1 having a thickness of 300 μm.

A SEM photograph (magnification: 20000×) of an internal structure of the gas absorbent 1 is shown in FIG. 2. In addition, a SEM photograph (magnification: 50000×) of a thin section cut out of the gas absorbent 1 is shown in FIG. 3(*a*), and the thin section was subjected to energy dispersion X-ray spectrophotometry (EDX) to take a TEM photograph of characteristics X-rays of nitrogen and carbon, as shown in FIG. 3(*b*). From the micrographs shown in FIGS. 2 and 3, it is confirmed that a porous structure was formed inside the film of the gas absorbent 1.

In addition, carbon black, the gas-absorbing material 1 (gas-absorbing material 1 before compaction molding) and the gas absorbent 1 were analyzed to measure the specific surface area, the total pore volume and the average pore diameter. The results are shown in Table 2. It is confirmed that even after compaction molding, gas-diffusible pores of carbon black were still kept as such. The ratio by volume in the gas absorbent 1 (amino group-containing polymer particles 1/carbon black/pores) was 0.433/0.429/0.138.

TABLE 2

| Measured Sample | Specific Surface Area ($m^2/g$) | Total Pore Volume ($cm^3/g$) | Average Pore Diameter (nm) |
|---|---|---|---|
| Carbon Black | 68 | — | — |
| Gas-Absorbing Material 1 | 29.587 | 0.2143 | 28.971 |
| Gas Absorbent 1 | 15.962 | 0.1438 | 36.028 |

(Examples 2 to 6) Production of Gas Absorbent Using Amino Group-Containing Polymer Particles 1, and Water-Repellent Carbon Black, Water-Repellent Silica RY200, Water-Repellent Silica R805, PTFE Particles or Hydrophilic Silica 200

Gas absorbents 2 to 6 were produced in the same manner as in Example 1 except that fine particles shown in Table 3 were used in place of carbon black.

(Comparative Example 1) Production of Comparative Gas Absorbent 1 of Amino Group-Containing Polymer Particles 1

A gas absorbent (comparative gas absorbent 1) was produced in the same manner as in Example 1 except that, in place of the composite material of the amino group-containing polymer particles 1 and carbon black, only the amino group-containing polymer particles 1 were compaction-molded into a film.

TABLE 3

| Example No | Gas Absorbent No | Fine Particles |
|---|---|---|
| Example 1 | Gas Absorbent 1 | carbon black |
| Example 2 | Gas Absorbent 2 | water-repellent carbon black |
| Example 3 | Gas Absorbent 3 | water-repellent silica RY200 |
| Example 4 | Gas Absorbent 4 | water-repellent silica R805 |
| Example 5 | Gas Absorbent 5 | PTFE particles |
| Example 6 | Gas Absorbent 6 | water-repellent silica 200 |
| Comparative Example 1 | Comparative Gas Absorbent 1 | no |

The $CO_2$ absorption amount of the gas absorbents 1 and 2 and the comparative gas absorbent 1, as measured in the absorption process, is shown in FIG. 4; and the $CO_2$ desorption amount thereof as measured in the desorption process is shown in FIG. 5. In addition, the $CO_2$ absorption amount of the gas absorbents 1 and 3 to 6, as measured in the absorption process, is shown in FIG. 6; and the $CO_2$ desorption amount thereof as measured in the desorption process is shown in FIG. 7. In these drawings, "GP" represents amino group-containing polymer particles 1, "CB" represents carbon black, "water-repellent CB" represents water-repellent carbon black, "RY200" represents water-repellent silica RY200, "R805" represents water-repellent silica R805, "PTFE" means PTFE particles, and "200" means hydrophilic silica 200. The same expressions shall apply also to FIGS. 8 to 10 and 12. The $CO_2$ absorption amount or the $CO_2$ desorption amount expressed by a unit "mL/g-GPs" or "mL/g" is the $CO_2$ absorption amount or the $CO_2$ desorption amount per gram of the amino group-containing polymer particles.

As shown in FIGS. 4 to 7, in the gas absorbents 1 to 6 each containing fine particles having a primary particle diameter of 1000 nm or less, the $CO_2$ absorption amount saturated and absorption finished within a short period of time, as compared with that in the comparative gas absorbents 1 not containing fine particles. Also as shown in FIGS. 6 and 7, the absorption speed and the desorption speed are higher in the order of the gas absorbents 3, 4 and 6 each using fine particles having an average primary particle diameter of 12 nm (water-repellent silica RY200, R805 and hydrophilic silica 200), the gas absorbent 1 using fine particles having an average primary particle diameter of 30 nm (carbon black CB), and the gas absorbent 5 using fine particles having an average primary particle diameter of 200 nm (PTFE particles), and it is known that fine particles having a smaller average primary particle diameter can improve more effectively the absorption speed and the desorption speed. Further, as shown in FIG. 4, the gas absorbent 2 using water-repellent carbon black (water-repellent CB) exhibited a larger $CO_2$ absorption/desorption amount than the gas absorbent 1 using carbon black (CB) not processed to be given water repellency.

From these results, it is confirmed that, when amino group-having polymer compound particles and fine particles having a primary particle diameter of 1000 nm or less are used together, the gas absorption/desorption speed can increase, and when the water repellency of the fine particles is increased, the reversible gas absorption performance improves.

Further, amino group-having polymer compound particles were prepared with varying the median diameter thereof within a range of 2 to 10 μm, and gas absorbents were produced in the same manner using the particles, and as a result, all the produced gas absorbents achieved the same reversible gas absorption performance as that of the gas absorbents of the above Examples.

(Evaluation of Reversible $CO_2$ Absorption Performance by Temperature Swing Absorption Method)

Evaluation of reversible $CO_2$ absorption performance by a temperature swing absorption method was carried out as follows.

First, a reactor in which a sample targeted for measurement had been put was put into a water bath conditioned at 30° C., and a mixed gas of $CO_2$ and $N_2$ ($CO_2$ concentration: 10.0% by volume) as humidified at 60° C. was introduced into the reactor at a flow rate of 100 mL/min to sufficiently humidify the target sample (humidification step). Subsequently, the reactor was rapidly transferred into a water bath conditioned at 75° C., and the gas discharged from the target sample was dehumidified, and the $CO_2$ concentration (B) thereof was measured with a multi-gas analyzer (VA-3000, by Horiba, Ltd.) (desorption step). After $CO_2$ was sufficiently desorbed from the target sample, the reactor was rapidly transferred into a water bath at 30° C., then the above-mentioned, humidified mixed gas of $CO_2$ and $N_2$ was introduced into the reactor at a rate of 100 mL/min, and the gas discharged from the target sample was dehumidified and thereafter the $CO_2$ concentration (A) thereof was measured with a multi-gas analyzer (absorption step). Here, the desorption step took 300 seconds, and the absorption step took 500 seconds. An integrated value of the difference between the $CO_2$ concentration of the introduced mixed gas and the $CO_2$ concentration (A) measured in the absorption step is referred to as a $CO_2$ absorption amount, and an integrated value of the $CO_2$ concentration (B) measured in the desorption step is referred to as a $CO_2$ desorption amount. A desorption-absorption cycle of alternately repeating the desorption step and the absorption step was carried out to evaluate the cycle performance. In showing the $CO_2$ absorption amount measured here on graphs, the value may be shown on the minus side of the vertical axis by a reference numeral "−" given to the value A, in order to distinguish the measured $CO_2$ absorption amount from the $CO_2$ desorption amount.

The $CO_2$ absorption amount in the absorption step of the gas absorbents 3 and 6 and the comparative gas absorbent 1 produced in the above Examples was measured according to a temperature swing absorption method, and is shown in FIG. 8, and the $CO_2$ desorption amount in the desorption step thereof is shown in FIG. 9. The $CO_2$ desorption amount and the $CO_2$ absorption amount in 5 cycles of desorption-absorption are shown in FIG. 10.

As shown in FIG. 8 to FIG. 10, the gas absorbents 3 and 6 containing fine particles exhibited a larger $CO_2$ absorption/desorption amount than the comparative gas absorbent 1 not containing fine particles. In particular, the gas absorbent 3 using water-repellent silica RY200 exhibited a larger $CO_2$ absorption/desorption amount than the gas absorbent 6 using hydrophilic silica, and exhibited stable desorption-absorption cycles. This is considered to be because moisture having condensed in the pores of the film may have a great influence on gas diffusion in a temperature swing absorption method where measurement is carried out at a high humidity, and in the gas absorbent 3, owing to the water repellency of the water-repellent silica RY to cover the amino group-containing polymer particles therein, the condensed water could be prevented from clogging the pores and could effectively function as a gas diffusion phase. From this, it is known that the gas absorbent containing water-repellent fine particles can be effectively utilized as a film for separating $CO_2$ at a high humidity in a short period of time.

[2] Investigation for Pelletization of Gas-Absorbing Material]

(Example 7) Production of Gas Absorbent 7 of Pellets of a Mixture of a Gas-Absorbing Material and Polyethylene In the same manner as that of the process of preparing the gas-absorbing material 1 in Example 1, a composite material (gas-absorbing material) of amino group-containing polymer particles 1 and carbon black CB was produced. The composite material and polyethylene (LDPE: Suntec LD M6520 by Asahi Kasei Corporation) were kneaded in a twin-screw kneading extruder (desktop kneader MC6, by Xplore Instruments BV) at a ratio by weight of composite material/polyethylene=2/1 to give a gas absorbent 7 of pellets having an average particle diameter of 3 mm.

(Comparative Example 2) Production of Comparative Gas Absorbent 2 of Pellets of a Mixture of Amino Group-Containing Polymer Particles 1 and Polyethylene Pellets (comparative gas absorbent 2) were produced in the same manner as in Example 7 except that a kneaded product prepared by kneading amino group-containing polymer particles 1 and polyethylene (LDPE: Suntec LD M6520 by Asahi Kasei Corporation) at a ratio by weight of amino group-containing polymer particles 1/polyethylene=4/1 was used.

SEM photographs of the gas absorbent 7 and the comparative gas absorbent 2 are shown in FIG. 11. In FIG. 11, the upper photographs are SEM photographs of the gas absorbent 7, and are a SEM photograph of an outward appearance of pellets, a SEM photograph taken at a magnification of 35× of an internal structure of pellets and a SEM photograph taken at a magnification of 5000× of an internal structure of pellets, in that order from the left side. In FIG. 11, the lower photographs are SEM photographs of the comparative gas absorbent 2, and are a SEM photograph of an outward appearance of pellets, a SEM photograph taken at a magnification of 35× of an internal structure of pellets and a SEM photograph taken at a magnification of 5000× of an internal structure of pellets, in that order from the left side.

The $CO_2$ absorption amount in the absorption step and the $CO_2$ desorption amount in the desorption step of the gas absorbent 7 and the comparative gas absorbent 2 were measured according to a temperature swing absorption method, and are shown in FIG. 12. It is confirmed that, in both the absorption step and the desorption step, the absorption/desorption speed in around the initial 30 minutes was accelerated by addition of carbon black CB.

[3] Investigation for Filling Amount of Gas-Absorbing Material

A gel of the amino group-containing polymer particles 2 produced in Synthesis Example 2 (aggregate of gel particles) was ground successively through a meat chopper at an opening degree of 4.5 mm (hole diameter 4.8 mm), 3.9 mm (hole diameter 4.0 mm), 3 mm (hole diameter 3.2 mm), 2.1 mm (hole diameter 2.4 mm), and 0.9 mm (hole diameter 1.1 mm) to give various ground products of the amino group-containing polymer compound (ground gel products) that had been ground at a different grinding degree. A water-repellent silica RY300 was added to the ground product in the blending ratio shown in Table 4 to produce a mixture. The mixture was put into a 250-mL plastic container and mixed by shaking, and then the surface was smoothed and the height was measured. The results are shown in the bold frame in Table 4. Among these mixtures, the particle size distribution of the mixture in which the proportion of the water-repellent silica RY300 was 0.50% by volume is shown in FIG. 13. Of a mixture prepared by adding water-repellent silica RY300 (0.50% by volume) to the amino group-containing polymer that had been ground at an opening degree of 2.1 mm (gas-absorbing material 8), and the amino group-containing polymer that had been ground at an opening degree of 2.1 mm (comparative gas-absorbing material), the $CO_2$ absorption amount in the absorption step and the $CO_2$ desorption amount in the desorption step, as measured according to a pressure swing absorption method, are shown in FIG. 14. Here, 10 L of the gas-absorbing material was used as a target sample for measurement, and a mixed gas of $CO_2$ and $N_2$ and an $N_2$ gas were applied at a flow rate of 1000 mL/min for measurement. In FIGS. 13 and 14, "0.9 mm-opening GP" to "4.5 mm-opening GP" each represent ground amino group-containing polymers that had been ground at an opening degree of 0.9 mm to 4.5 mm, and "RY300" represents water-repellent silica RY300.

TABLE 4

| Condition of Mixture | | Height of Mixture in 250-mL Container | | | | | | | |
|---|---|---|---|---|---|---|---|---|---|
| Ground Amino Group-Containing Polymer:Water-Repellent Silica RY300 | vol %:vol % | 100.00:0.00 | 99.90:0.10 | 99.75:0.25 | 99.50:0.50 | 99.25:0.75 | 99.00:1.00 | 98.50:1.50 | 98.00:2.00 |
| | weight (g):weight (g) | 50.00:0.00 | 49.90:0.10 | 49.75:0.25 | 49.50:0.50 | 49.26:0.74 | 49.01:0.99 | 48.52:1.48 | 48.04:1.96 |
| Grinding Degree of Ground Amino Group-Containing Polymer | 3.9 mm opening | 3.7 cm | 3.8 cm | 3.0 cm | 3.0 cm | 3.0 cm | 3.2 cm | 3.3 cm | 3.6 cm |
| | 3 mm opening | 3.5 cm | 3.8 cm | 3.4 cm | 2.9 cm | 2.9 cm | 3.1 cm | 3.2 cm | 3.5 cm |
| | 2.1 mm opening | 3.9 cm | 3.7 cm | 3.3 cm | 3.0 cm | 3.1 cm | 3.2 cm | 3.5 cm | 3.7 cm |
| | 0.9 mm opening | 3.8 cm | 3.7 cm | 3.1 cm | 3.0 cm | 3.1 cm | 3.2 cm | 3.4 cm | 3.6 cm |

As shown in Table 4, the volume (filling ration) of the mixture varied by varying the proportion of the water-repellent silica RY300. When the proportion of the water-repellent silica RY300 was 0.50% by volume, the volume was the smallest (that is, the filling ration was large). Also as shown in FIG. 14, the composite material (gas-absorbing material 8) having a large filling ration greatly improved in the reversible $CO_2$ absorption amount per unit mass and in the $CO_2$ absorption/desorption speed as compared with the comparative gas-absorbing material 3 not containing the water-repellent silica RY300.

From this, it is known that, by adding fine particles, the filling ration of the gas-absorbing can be increased to improve the reversible $CO_2$ absorption amount and the $CO_2$ absorption/desorption speed.

The ground amino group-containing polymers used in the following Examples 9 and 10 are also ground amino group-containing polymers produced according to the same process as that for the ground amino group-containing polymers produced in this section.

[4] Investigation of Effect to be Attained by Grinding Gas-Absorbing Material (Example 9) Production of Gas-Absorbing Material 9 of a Ground Product Prepared by Further Finely Grinding a Mixture of a Ground Amino Group-Containing Polymer and a Water-Repellent Silica RY300

A ground amino group-containing polymer prepared by grinding at an opening degree of 4.5 mm with a meat chopper and a water-repellent silica RY300 were mixed at a ratio by volume, ground amino group-containing polymer/water-repellent silica RY300=99.5/0.5 to prepare a mixture. The mixture was ground using a planetary ball mill (P-5, by Fritsch Japan) with zirconia beads having a diameter of 5 mm, at 230 rpm to prepare a gas-absorbing material 9 of a ground product. The particle size distribution of the ground product was measured, and it was confirmed that most of the polymer articles had a particle diameter of less than 100 μm. The water content of the ground product was 72.45% by weight, and the water content of the ground amino group-containing polymer contained therein was 73.17% by weight, that is, these were somewhat smaller than the water content of the unground amino group-containing polymer particles 2 (73.7% by weight).

FIG. 15 shows the $CO_2$ absorption amount of the gas-absorbing material 9 and the gas-absorbing material 8 in the absorption step, as measured according to a pressure swing absorption method. Here, 10 L of the gas-absorbing material was used as a sample targeted for measurement, and the flow rate of a mixed gas of $CO_2$ and $N_2$ and the flow rate of $N_2$ gas each were 3000 mL/min in measurement.

From FIG. 15, it is known that the $CO_2$ absorption speed of the gas-absorbing material 9 that had been ground in a bead mill dramatically increased as compared with that of the gas-absorbing material 8 not ground in a bead mill. From this, it is known that, by increasing the grinding degree of the gas-absorbing material, the reversible $CO_2$ absorption performance thereof can be higher.

[5] Investigation of Effect to be Attained by Binder Spraying on Gas-Absorbing Material and Granulation Thereof (Example 10) Production of Gas-Absorbing Material 10 of Granulated Particles Prepared by Granulating a Mixture of a Ground Amino Group-Containing Polymer and a Water-Repellent Silica RY300 Using a Binder A ground amino group-containing polymer prepared by grinding at an opening degree of 2.1 mm with a meat chopper and a water-repellent silica RY300 were put into a pan granulator (DPZ-01R, by AS ONE Corporation) and mixed therein at a ratio by volume, ground amino group-containing polymer/water-repellent silica RY300=99.8/0.2. While an aqueous solution of nanoparticles (400 mL) prepared by dissolving amino group-containing polymer particles 1 in water at a ratio of 20 g/ml was sprayed over the mixture in the granulator, the mixture was granulated by stirring under heat to give a gas absorbent 10 of granulated particles.

FIG. 16(*a*) shows a particle size distribution of the mixture before granulation, and FIG. 16(*b*) shows a particle size distribution of granulated particles (gas-absorbing material 11).

From comparison of FIGS. 16(*a*) and (*b*), it is known that the particle size increased by granulation and the granulated gas-absorbing material is suppressed from scattering.

INDUSTRIAL APPLICABILITY

The gas-absorbing material of the present invention can absorb and desorb an acidic gas such as carbon dioxide at a high speed, and exhibits excellent reversible gas absorption performance. Therefore, by using the gas-absorbing material of the present invention, the time efficiency for a gas separation and recovery process improves and cost can be reduced. Accordingly, the industrial applicability of the present invention is great.

The invention claimed is:

1. A gas-absorbing material that contains amino group-having polymer compound particles and fine particles having a primary particle diameter of 1000 nm or less excepting the amino group-having polymer compound particles, provided that at least one of the following three conditions is satisfied:

(1) the fine particle has a substrate particle and a water-repellent coating film formed on the surface of the substrate particle, (2) the fine particles are ones prepared by subjecting substrate particles to water repellency-imparting surface treatment, and (3) the gas-absorbing material contains amino group-having polymer compound particles and, in addition to the amino group-having polymer compound particles, fine particles having a primary particle diameter of 1000 nm or less excepting the amino group-having polymer compound particles and excepting fine particles contained in amino group-having polymer compound particles.

2. The gas-absorbing material according to claim 1, wherein the fine particles are particles containing silica or carbon.

3. The gas-absorbing material according to claim 1, wherein the water contact angle of the fine particles is 70° or more.

4. The gas-absorbing material according to claim 1, wherein the fine particles are fine particles containing a carbon black or a fluororesin.

5. The gas-absorbing material according to claim 1, wherein the fine particle has a substrate particle and a water-repellent coating film formed on the surface of the substrate particle.

6. The gas-absorbing material according to claim 5, wherein the water-repellent coating film contains a dialkylpolysiloxane.

7. The gas-absorbing material according to claim 1, wherein the fine particles are ones prepared by subjecting the substrate particles to water repellency-imparting surface treatment.

8. The gas-absorbing material according to claim 7, wherein the surface modification is one for introducing an alkyl group into the substrate particle.

9. The gas-absorbing material according to claim 1, wherein the average primary particle diameter of the fine particles is 5 to 500 nm.

10. The gas-absorbing material according to claim 1, wherein the amino group-having polymer compound particles contain a polymer of a monomer component containing an amino group-having substituted (meth)acrylamide monomer.

11. The gas-absorbing material according to claim 10, wherein the amino group-having substituted (meth)acrylamide monomer is an N-(aminoalkyl) (meth)acrylamide.

12. The gas-absorbing material according to claim 1, wherein the median diameter of the amino group-having polymer compound particles in a dry state is 2 to 10 μm.

13. The gas-absorbing material according to claim 1, wherein the average primary particle diameter of the fine particles is smaller than the median diameter of the amino group-having polymer compound particles in a dry state.

14. The gas-absorbing material according to claim 1, wherein the content of the amino group-having polymer compound particles is, as a solid content, larger than the content of the fine particles.

15. A gas absorbent containing granulated particles of the gas-absorbing material of claim 1, a shaped article of a mixture that contains the gas-absorbing material of claim 1 and a thermoplastic resin, or a powder compaction-molded article of the gas-absorbing material of claim 1.

16. The gas absorbent according to claim 15, further containing a filler.

17. The gas absorbent according to claim 16, wherein the filler is active carbon or zeolite.

18. A gas separator containing the gas-absorbing material of claim 1.

19. A filter having the gas separator of claim 18.

20. A gas separation unit having the gas separator of claim 18.

* * * * *